United States Patent
Huang

(10) Patent No.: US 12,021,760 B2
(45) Date of Patent: Jun. 25, 2024

(54) ROUTING ESTABLISHING METHOD AND COMMUNICATION ROUTER USING THE SAME

(71) Applicants: INDUSTRIAL TECHNOLOGY RESEARCH INSTITUTE, Hsinchu (TW); CSBC Corporation, Taiwan, Kaohsiung (TW)

(72) Inventor: Yu-Wen Huang, Kaohsiung (TW)

(73) Assignees: INDUSTRIAL TECHNOLOGY RESEARCH INSTITUTE, Hsinchu (TW); CSBC CORPORATION, TAIWAN, Kaohsiung (TW)

( * ) Notice: Subject to any disclaimer, the term of this patent is extended or adjusted under 35 U.S.C. 154(b) by 62 days.

(21) Appl. No.: 17/412,699

(22) Filed: Aug. 26, 2021

(65) Prior Publication Data

US 2022/0417179 A1 Dec. 29, 2022

(30) Foreign Application Priority Data

Jun. 29, 2021 (TW) ................................. 110123860

(51) Int. Cl.
*H04L 49/25* (2022.01)
*H04L 45/00* (2022.01)
(Continued)

(52) U.S. Cl.
CPC .............. *H04L 49/25* (2013.01); *H04L 45/02* (2013.01); *H04L 45/72* (2013.01); *H04W 40/02* (2013.01);
(Continued)

(58) Field of Classification Search
CPC ...................................................... H04L 49/25
See application file for complete search history.

(56) References Cited

U.S. PATENT DOCUMENTS 9,743,383 B1  8/2017  Norin
10,554,482 B2 * 2/2020 Rengarajan ........... H04L 41/147
(Continued)

FOREIGN PATENT DOCUMENTS

CN  102090026 A  6/2011
CN  106409008 A  2/2017
(Continued)

OTHER PUBLICATIONS

Taiwanese Office Action and Search Report for Taiwanese Application No. 110123860, dated Apr. 27, 2022.
(Continued)

*Primary Examiner* — Jason E Mattis
(74) *Attorney, Agent, or Firm* — Birch, Stewart, Kolasch & Birch, LLP

(57) ABSTRACT

A routing establishing method for constructing a routing of a chain network including communication routers, each including a wired communication module, a wireless communication module, and a device configuration file. In a wired exploration procedure, exploration is performed by the source communication router through the wired communication module to obtain a wired communication status between the source and the destination communication routers. In a wireless exploration procedure, exploration is performed by the source communication router through the wireless communication module to obtain a wireless communication status between the source and the destination communication routers. In a routing decision procedure, next hop of the source communication router and whether the transmission routing is through the wired or the wireless communication module are determined and set according to the wired and the wireless communication status. The device configuration file includes device numbers related to relative positions of the communication routers.

22 Claims, 18 Drawing Sheets

(51) Int. Cl.
  *H04L 45/02* (2022.01)
  *H04W 40/02* (2009.01)
  *H04W 40/24* (2009.01)
  *H04L 49/351* (2022.01)
  *H04W 84/12* (2009.01)

(52) U.S. Cl.
  CPC .......... *H04W 40/24* (2013.01); *H04L 49/351* (2013.01); *H04W 84/12* (2013.01)

(56) References Cited

U.S. PATENT DOCUMENTS

| | | | |
|---|---|---|---|
| 2004/0052226 A1* | 3/2004 | Frank | H04L 49/351 370/349 |
| 2004/0081154 A1* | 4/2004 | Kouvelas | H04L 69/165 370/392 |
| 2004/0258051 A1* | 12/2004 | Lee | H04L 12/6418 370/352 |
| 2007/0030823 A1 | 2/2007 | Guo et al. | |
| 2010/0296497 A1* | 11/2010 | Karaoguz | H04W 28/16 370/338 |
| 2013/0121238 A1* | 5/2013 | Yamada | H04W 88/04 370/327 |
| 2014/0016468 A1* | 1/2014 | Daraiseh | H04L 45/121 370/235 |
| 2014/0169174 A1* | 6/2014 | Gilson | H04L 45/24 370/389 |
| 2015/0146603 A1 | 5/2015 | Wu et al. | |
| 2017/0005830 A1* | 1/2017 | Zhang | H04L 12/4633 |
| 2017/0041188 A1 | 2/2017 | Panchapakesan et al. | |
| 2020/0059725 A1 | 2/2020 | Maly et al. | |

FOREIGN PATENT DOCUMENTS

| | | |
|---|---|---|
| CN | 107452229 A | 12/2017 |
| CN | 107949010 A | 4/2018 |
| CN | 110191029 A | 8/2019 |
| CN | 110519665 A | 11/2019 |
| CN | 110932950 A | 3/2020 |
| CN | 111355599 A | 6/2020 |
| EP | 2 980 700 A1 | 2/2016 |
| TW | 202023242 A | 6/2020 |
| WO | WO 2019/183919 A1 | 10/2019 |

OTHER PUBLICATIONS

"Hybrid Wired/Wireless Networks for Real-Time Communications", IEEE Industrial Electronics Magazine, Mar. 2008, pp. 8-20.
Aher et al., "A Hybrid Wired/Wireless Infrastructure Networking for Green House Management", International Conference on Automatic Control and Dynamic Optimization Techniques (ICACDOT), 2016, pp. 1152-1157.
Alves et al., "Real-Time Communications over Hybrid Wired/Wireless PROFIBUS-based Networks", IEEE 2002, Total 10 pages.
Katayama et al., "A multi-protocol wireless multi-hop network employing a new efficient hybrid routing scheme", IEEE 2003, pp. 2013-2017.
Mahmood et al., "Clock Synchronization for IEEE 802.11 based Wired-Wireless Hybrid Networks using PTP", IEEE 2012, Total 6 pages.
Si et al., "A Robust Load Balancing and Routing Protocol for Intra-Car Hybrid Wired/Wireless Networks", Feb. 2019, Total 7 pages.

* cited by examiner

| Wired routing table generated when the communication router $C_{1,1}$ is used as the source communication router ||| 
|---|---|---|
| Destination communication router | Type of communication module | Next hop |
| $C_{1,2}$ | Wired communication module | $C_{1,2}$ |
| $C_{1,3}$ | Wired communication module | $C_{1,3}$ |
| $C_{1,4}$ | Wired communication module | $C_{1,3}$ |
| $C_{1,5}$ | Wired communication module | $C_{1,3}$ |

FIG. 5A

| Wireless routing table generated when the communication router $C_{1,1}$ is used as the source communication router ||| 
|---|---|---|
| Destination communication router | Type of communication module | Next hop |
| $C_R$ | Wireless communication module | $C_R$ |

FIG. 5B

| Wired routing table generated when the communication router $C_{1,2}$ is used as the source communication router ||| 
|---|---|---|
| Destination communication router | Type of communication module | Next hop |
| $C_R$ | Wired communication module | $C_{1,1}$ |
| $C_{1,1}$ | Wired communication module | $C_{1,1}$ |
| $C_{1,3}$ | Wired communication module | $C_{1,3}$ |
| $C_{1,4}$ | Wired communication module | $C_{1,3}$ |
| $C_{1,5}$ | Wired communication module | $C_{1,3}$ |

FIG. 5C

| Wireless routing table generated when the communication router $C_{1,2}$ is used as the source communication router |||
|---|---|---|
| Destination communication router | Type of communication module | Next hop |
| $C_{1,3}$ | Wireless communication module | $C_{1,3}$ |
| $C_{1,4}$ | Wireless communication module | $C_{1,3}$ |
| $C_{1,5}$ | Wireless communication module | $C_{1,3}$ |

FIG. 5D

| Wired routing table generated when the root communication router $C_R$ is used as the source communication router |||
|---|---|---|
| Destination communication router | Type of communication module | Next hop |
| N/A | Wired communication module | N/A |

FIG. 5E

| Wireless routing table generated when the root communication router $C_R$ is used as the source communication router |||
|---|---|---|
| Destination communication router | Type of communication module | Next hop |
| $C_{1,1}$ | Wireless communication module | $C_{1,1}$ |
| $C_{1,2}$ | Wireless communication module | $C_{1,1}$ |
| $C_{1,3}$ | Wireless communication module | $C_{1,1}$ |
| $C_{1,4}$ | Wireless communication module | $C_{1,1}$ |
| $C_{1,5}$ | Wireless communication module | $C_{1,1}$ |

FIG. 5F

| Routing optimization decision table generated when the communication router $C_{1,1}$ is used as the source communication router |||
|---|---|---|
| Destination communication router | Type of communication module | Next hop |
| $C_R$ | Wireless communication module | $C_R$ |
| $C_{1,2}$ | Wired communication module | $C_{1,2}$ |
| $C_{1,3}$ | Wired communication module | $C_{1,3}$ |
| $C_{1,4}$ | Wired communication module | $C_{1,3}$ |
| $C_{1,5}$ | Wired communication module | $C_{1,3}$ |

FIG. 6A

| Routing optimization decision table generated when the communication router $C_{1,2}$ is used as the source communication router |||
|---|---|---|
| Destination communication router | Type of communication module | Next hop |
| $C_R$ | Wired communication module | $C_{1,1}$ |
| $C_{1,2}$ | Wired communication module | $C_{1,1}$ |
| $C_{1,3}$ | Wired communication module | $C_{1,3}$ |
| $C_{1,4}$ | Wired communication module | $C_{1,3}$ |
| $C_{1,5}$ | Wired communication module | $C_{1,3}$ |

FIG. 6B

| Routing optimization decision table generated when the root communication router $C_R$ is used as the source communication router |||
|---|---|---|
| Destination communication router | Type of communication module | Next hop |
| $C_{1,1}$ | Wireless communication module | $C_{1,1}$ |
| $C_{1,2}$ | Wireless communication module | $C_{1,1}$ |
| $C_{1,3}$ | Wireless communication module | $C_{1,1}$ |
| $C_{1,4}$ | Wireless communication module | $C_{1,1}$ |
| $C_{1,5}$ | Wireless communication module | $C_{1,1}$ |

FIG. 6C

| Wired routing table generated when the communication router $C_{1,2}$ is used as the source communication router ||| 
|---|---|---|
| Destination communication router | Type of communication module | Next hop |
| $C_R$ | Wired communication module | $C_{1,1}$ |
| $C_{1,1}$ | Wired communication module | $C_{1,1}$ |

FIG. 8A

| Wireless routing table generated when the communication router $C_{1,2}$ is used as the source communication router ||| 
|---|---|---|
| Destination communication router | Type of communication module | Next hop |
| $C_{1,4}$ | Wireless communication module | $C_{1,4}$ |
| $C_{1,5}$ | Wireless communication module | $C_{1,4}$ |

FIG. 8B

| Routing optimization decision table generated when the communication router $C_{1,2}$ is used as the source communication router ||| 
|---|---|---|
| Destination communication router | Type of communication module | Next hop |
| $C_R$ | Wired communication module | $C_{1,1}$ |
| $C_{1,1}$ | Wired communication module | $C_{1,1}$ |
| $C_{1,4}$ | Wireless communication module | $C_{1,4}$ |
| $C_{1,5}$ | Wireless communication module | $C_{1,4}$ |

FIG. 8C

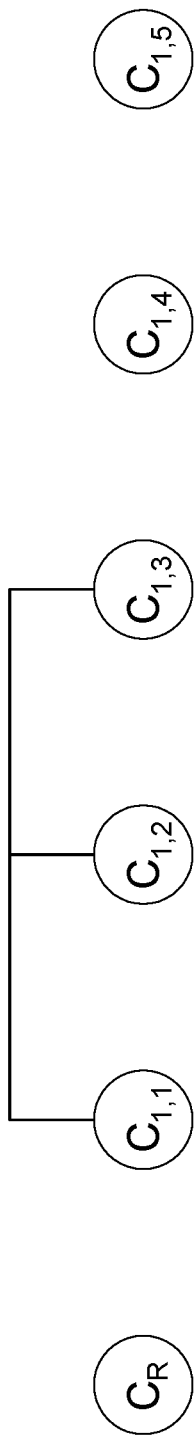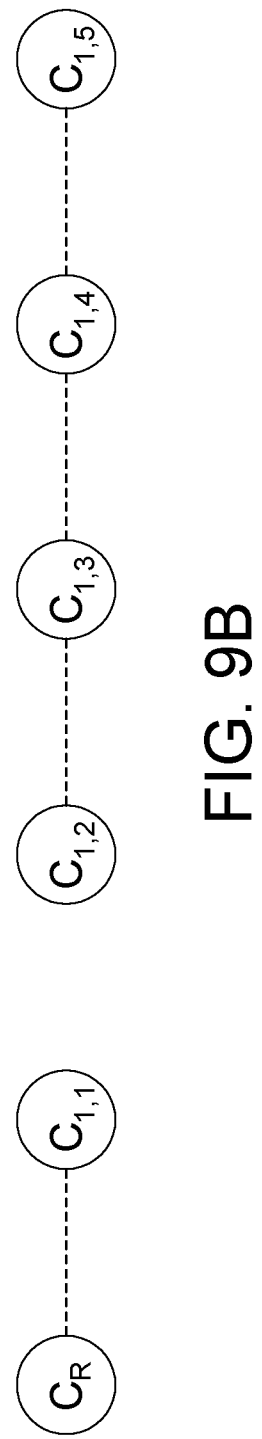

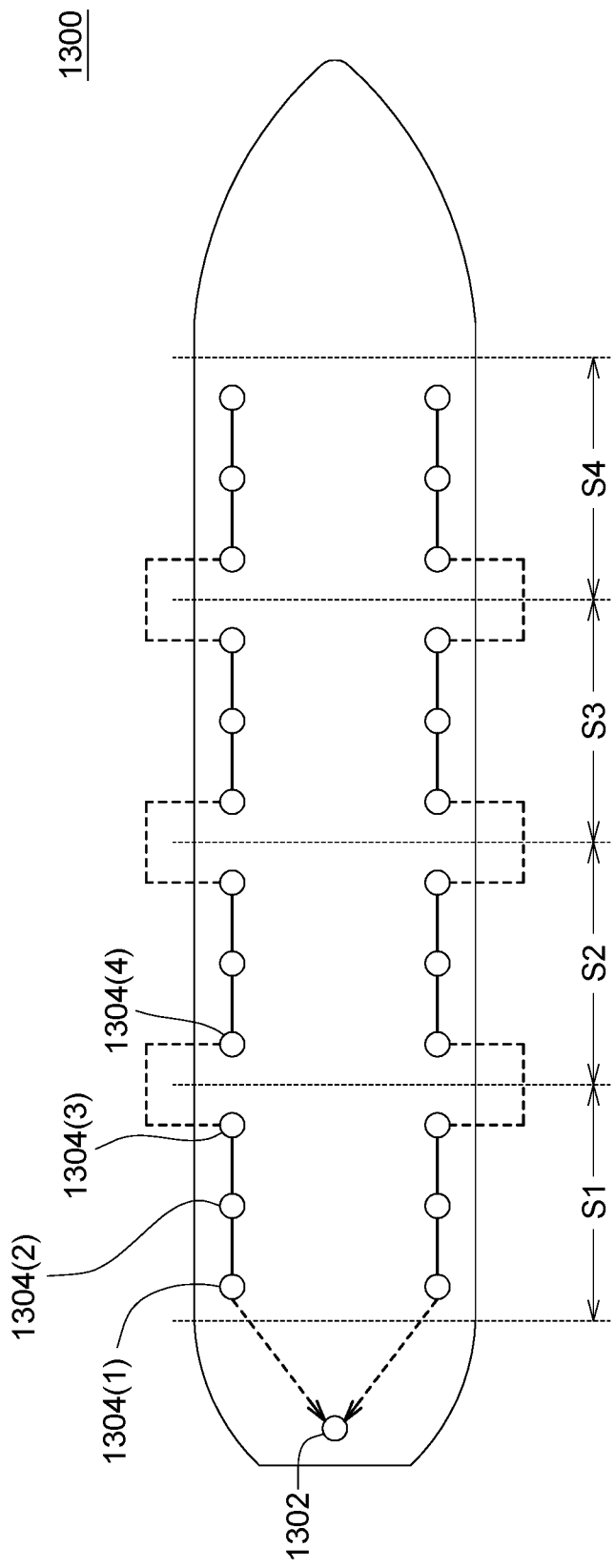

ROUTING ESTABLISHING METHOD AND COMMUNICATION ROUTER USING THE SAME

This application claims the benefit of Taiwan application Serial No. 110123860, filed Jun. 29, 2021, the disclosure of which is incorporated by reference herein in its entirety.

TECHNICAL FIELD

The disclosure relates in general to a routing establishing method and a communication router using the same.

BACKGROUND

Generally speaking, it is more difficult to construct a network in a long, narrow and closed space than in an open space. Examples of long, narrow and closed space include sewers, tunnels, subway tracks, indoor tracks, entertainment spaces, quarries, and cabins. The long, narrow and closed space has many barriers, such as metal barriers, which may block wireless communication and make wireless network unable to cover the entire space.

Therefore, before a backbone network is constructed during the establishment of network in a long, narrow and closed space, network engineers normally need to examine the physical environment of the site, plan the location and layout for the network equipment, and set the network equipment in advance. Apart from finding suitable locations for the installment of wireless accessors and wireless routers, the network engineers also need to consider the installment of physical transmission lines in addition to the wireless network. When the transmission lines are broken or the system malfunctions, the maintenance and repair job is very complicated and time consuming and requires manual operation of the network engineers, not only increasing the cost of network maintenance, but also taking more time for troubleshooting and more waiting time and causing more inconvenience to the users.

Therefore, it has become a prominent task for the industries to resolve the above problems of constructing a network in a long, narrow and closed space, such as the construction being complicated and difficult, the maintenance being time consuming, and the construction cost being too high.

SUMMARY

According to one embodiment of the disclosure, a routing establishing method configured to construct a routing of a chain network including a number of communication routers is provided. The communication routers include a source communication router and a number of other communication routers. The routing establishing method is applied in the source communication router including a wired communication module, a wireless communication module, and a device configuration file. The routing establishing includes the following steps. A wired exploration procedure is performed by the source communication router according to the device configuration file through the wired communication module to obtain a wired communication status between the source communication router and a destination communication router among the other communication routers. A wireless exploration procedure is performed by the source communication router according to the device configuration file through the wireless communication module to obtain a wireless communication status between the source communication router and the destination communication router. A routing decision procedure is performed by the source communication router to determine and set, according to the wired communication status and the wireless communication status, the next hop of the source communication router in a transmission routing from the source communication router to the destination communication router and whether the transmission routing is through the wired communication module or the wireless communication module. The device configuration file includes device numbers related to relative positions of the communication routers in the chain network.

According to another embodiment of the disclosure, a communication router with automatic routing establishment is provided. The communication router is applied in a chain network, which includes a number of communication routers. One of the communication routers includes a wired communication module, a wireless communication module, a storage unit, an environment exploration learning module, and a routing optimization decision module. The storage unit is configured to store a device configuration file. The environment exploration learning module is configured to perform a wired exploration procedure and a wireless exploration procedure. The wired exploration procedure includes performing exploration according to the device configuration file through the wired communication module to obtain a wired communication status between the communication router and a destination communication router among the other communication routers in the chain network. The wireless exploration procedure includes performing exploration according to the device configuration file through the wireless communication module to obtain a wireless communication status between the communication router and the destination communication router. The routing optimization decision module is configured to perform a routing decision procedure including determining and setting, according to the wired communication status and the wireless communication status, the next hop of the communication router in a transmission routing from the communication router to the destination communication router and whether the transmission routing is through the wired communication module or the wireless communication module. The device configuration file includes device numbers related to relative positions of the communication routers in the chain network.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIGS. 5A to 5F are examples of wireless routing tables and wired routing tables generated when the single-chain network of FIG. 4 is in a connection status.

FIGS. 6A to 6C are examples of routing optimization decision tables generated by the routing optimization decision module based on a routing optimization decision algorithm according to the wireless routing tables and the wired routing tables of FIGS. 5A to 5F for the single-chain network.

FIG. 8A is a wired routing table for the arrangement that the communication router $C_{1,2}$ is used as a source communication router.

FIG. 8B is a wireless routing table for the arrangement that the communication router $C_{1,2}$ is used as a source communication router.

FIG. 8C is a routing optimization decision table for the arrangement that the communication router $C_{1,2}$ is used as a source communication router.

FIGS. 9A to 9C are equivalent network architecture diagrams of the single-chain network of FIG. 4.

FIG. 13 is a schematic diagram of an example of an embodiment of the present disclosure used in a long and narrow cabin.

Figure 1:
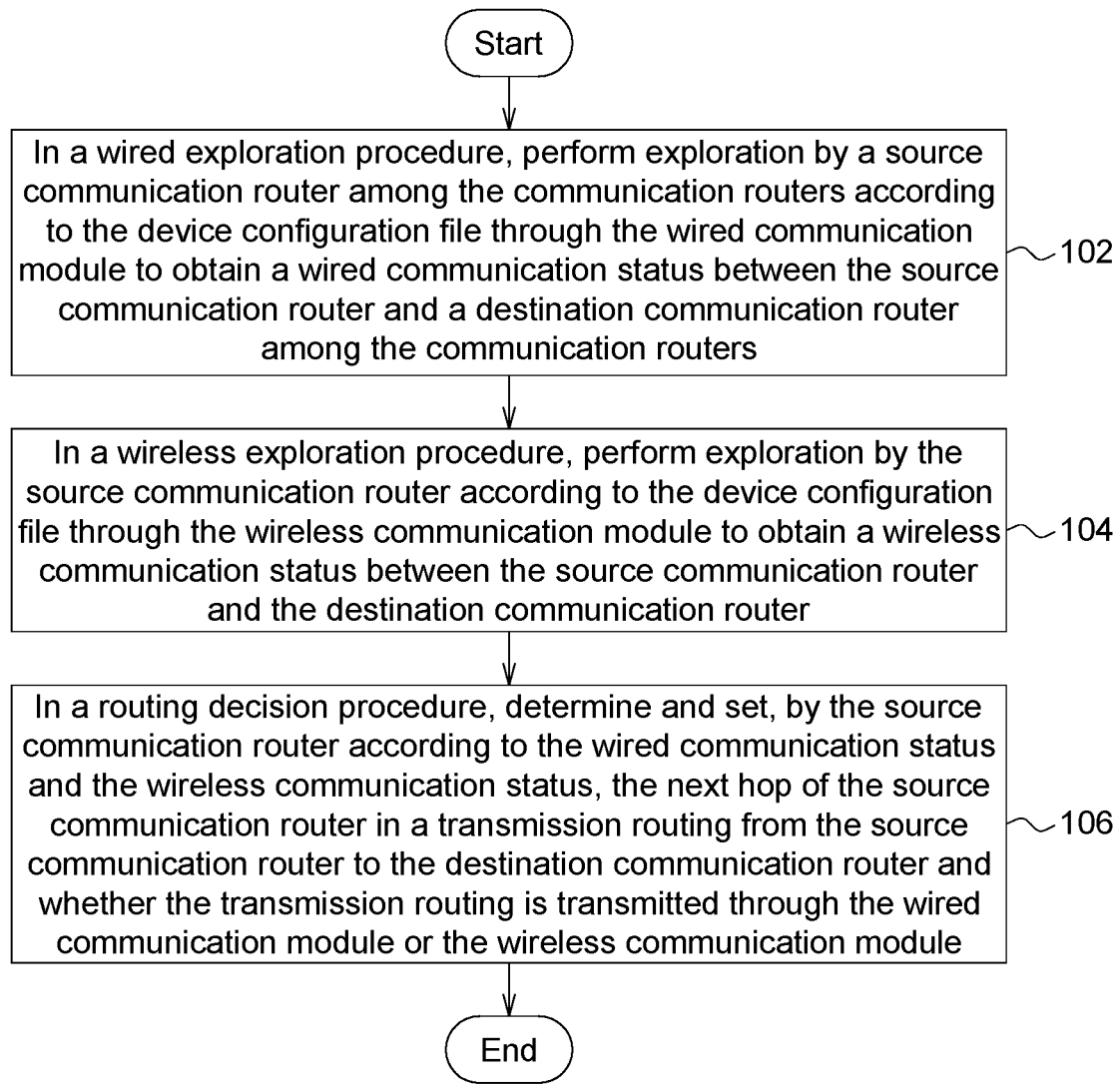
FIG. 1 is a flowchart of a routing establishing method according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a flowchart of a routing establishing method according to an embodiment of the present disclosure is shown. The routing establishing method is configured to construct a routing of a chain network including a number of communication routers. Each communication router includes a wired communication module, a wireless communication module and a device configuration file. The communication routers in the chain network include a source communication router and a number of other communication routers. The routing establishing method includes the following steps. Firstly, the method begins at step 102, in a wired exploration procedure, a source communication router among the communication routers performs exploration according to the device configuration file through the wired communication module to obtain a wired communication status between the source communication router and a destination communication router among the other communication routers. Then, the method proceeds to step 104, in a wireless exploration procedure, exploration is performed by the source communication router according to the device configuration file through the wireless communication module to obtain a wireless communication status between the source communication router and the destination communication router. Then, the method proceeds to step 106, in a routing decision procedure, the source communication router, determines and sets, according to the wired communication status and the wireless communication status, the next hop of the source communication router in a transmission routing from the source communication router to the destination communication router and whether the transmission routing is through the wired communication module or the wireless communication module. The device configuration file includes device numbers of the communication routers. The device numbers are related to relative positions of the communication routers in the chain network.

In the wired exploration procedure, when the source communication router performs exploration according to the device configuration file through the wired communication module and determines that the source communication router is capable of communicating with the destination communication router through the wired communication module, the source communication router determines one of the other communication routers as the next hop through which the source communication router transmits data to the destination communication router through the wired communication module. In the wireless exploration procedure, when the source communication router performs exploration according to the device configuration file through the wireless communication module and determines that the source communication router is capable of communicating with the destination communication router through the wireless communication module, the source communication router determines one of the other communication routers as the next hop through which the source communication router transmits data to the destination communication router through the wireless communication module.

Each communication router further includes at least one explosion routing table. In the present embodiment, the at least one explosion routing table includes a wired routing table and a wireless routing table, for example. In the wired exploration procedure, a device number and a communication module type of the other communication router determined as the next hop of the source communication router are recorded in the at least one explosion routing table, such as the wired routing table. In the wireless exploration procedure, a device number and a communication module type of the other communication router determined as the next hop of the source communication router are recorded in the at least one explosion routing table, such as the wireless routing table. In other embodiments, the wired routing table and the wireless routing table can be integrated as a single routing table in which the information of the communication module type corresponds to the wired exploration procedure or the wireless exploration procedure.

In the routing decision procedure, the source communication router, according to at least one explosion routing table (for example, the wired routing table and the wireless routing table) and a routing optimization decision algorithm, sets the transmission routing of the source communication router to be through the wired communication module and sets the next hop of the source communication router to be the other communication router determined as the next hop in the wired exploration procedure, or sets the transmission routing of the source communication router to be through the wireless communication module and sets the next hop of the source communication router to be the other communication router determined as the next hop in the wireless exploration procedure.

In the wired exploration procedure, the step of determining, by the source communication router, one of the other communication routers as the next hop through which the source communication router transmits data to the destination communication router through the wired communication module includes steps (a1) to (a3). In step (a1), whether the source communication router is capable of directly communicating with the destination communication router through the wired communication module is tested. In step (a2), when the source communication router is capable of directly communicating with the destination communication router through the wired communication module, the destination communication router is set to be the next hop through which the source communication router transmits data to the destination communication router through the wired communication module. In step (a3), when the source communication router is not capable of directly communicating with the destination communication router through the wired communication module and is capable of communicating with the destination communication router through the wired communication module and at least one wired candidate router among the other communication routers, the wired candidate router closest to the destination communication router is set to be the next hop through which the source communication router transmits data to the destination communication router through the wired communication module. The step of setting the wired candidate router closest to the destination communication router to be the next hop through which the source communication router transmits data to the destination communication router through the wired communication module advantageously reduces the number of times of transferring the packet data through the communication router.

The above step (a3) of setting the wired candidate router closest to the destination communication router to be the next hop through which the source communication router transmits data to the destination communication router through the wired communication module further includes sub-steps (a31) to (a33). In sub-step (a31), when the source communication router is not capable of directly communicating with the destination communication router through the wired communication module, the at least one wired candidate router among the other communication routers with which the source communication router is capable of communicating through the wired communication module is determined by the source communication router according to the device configuration file. In sub-step (a32), whether the source communication router is capable of communicating with the destination communication router through the wired communication module and the at least one wired candidate router is tested. In sub-step (a33), when the source communication router is capable of communicating with the destination communication router through the wired communication module and the at least one wired candidate router, the wired candidate router closest to the destination communication router is set to be the next hop through which the source communication router transmits data to the destination communication router through the wired communication module.

In the wireless exploration procedure, the step of determining, by the source communication router, one of the other communication routers as the next hop through which the source communication router transmits data to the destination communication router through the wireless communication module further includes step (b1). In step (b1), whether the source communication router is capable of directly communicating with the destination communication router through the wireless communication module and at least one wireless candidate router among the other communication routers is tested, and when the source communication router is capable of communicating with the destination communication router through the wireless communication module and at least one wireless candidate router among the other communication routers, the wireless candidate router closest to the source communication router is set to be the next hop through which the source communication router transmits data to the destination communication router through the wireless communication module.

The above step (b1) of setting the wireless candidate router closest to the source communication router to be the next hop through which the source communication router transmits data to the destination communication router through the wireless communication module further includes sub-steps (b11) to (b16). In sub-step (b11), a wireless candidate router closest to the source communication router among the other communication routers with which the source communication router is capable of communicating through the wireless communication module is determined by the source communication router according to the device configuration file. In sub-step (b12), whether the source communication router is capable of communicating with the destination communication router through the wireless communication module and the wireless candidate router is tested. In sub-step (b13), when the source communication router is capable of communicating with the destination communication router through the wireless communication module and the wireless candidate router, the wireless candidate router is set to be the next hop through which the source communication router transmits data to the destination communication router through the wireless communication module.

In step (b12), when the source communication router is not capable of communicating with the destination communication router through the wireless communication module and the closest wireless candidate router, the procedure proceeds to sub-step (b14). In sub-step (b14), another wireless candidate router second closest to the source communication router among the other communication routers with which the source communication router is capable of communicating through the wireless communication module is determined by the source communication router according to the device configuration file. In sub-step (b15), whether the source communication router is capable of communicating with the destination communication router through the wireless communication module and the another wireless candidate router is tested. In sub-step (b16), when the source communication router is capable of communicating with the destination communication router through the wireless communication module and the another wireless candidate router, the another wireless candidate router second closest to the source communication router is set to be the next hop through which the source communication router transmits data to the destination communication router through the wireless communication module.

In step (b15), when the source communication router 200 is not capable of communicating with the destination communication router through the wireless communication module and the another wireless candidate router which is second closest to the source communication router, sub-steps (b14), (b15) and (b16) are performed until a relay wireless candidate router is found in step (b16). In other words, the wireless exploration procedure is to sequentially determine or select a wireless candidate router among other communication routers according to the distance between each other communication router and the source communication router from the closest to the farthest until the wireless candidate router that can enable communication is determined or selected. That is, when the source communication router is capable of communicating with the destination communication router through the wireless communication module and the determined or selected wireless candidate router, the determined or selected wireless candidate router is set to be the next hop.

The wired communication module can be a power line communication module or an Ethernet communication module. The wireless communication module can be a Wi-Fi communication module. The attribute of each communication router is a root node or a leaf node.

Figure 2:
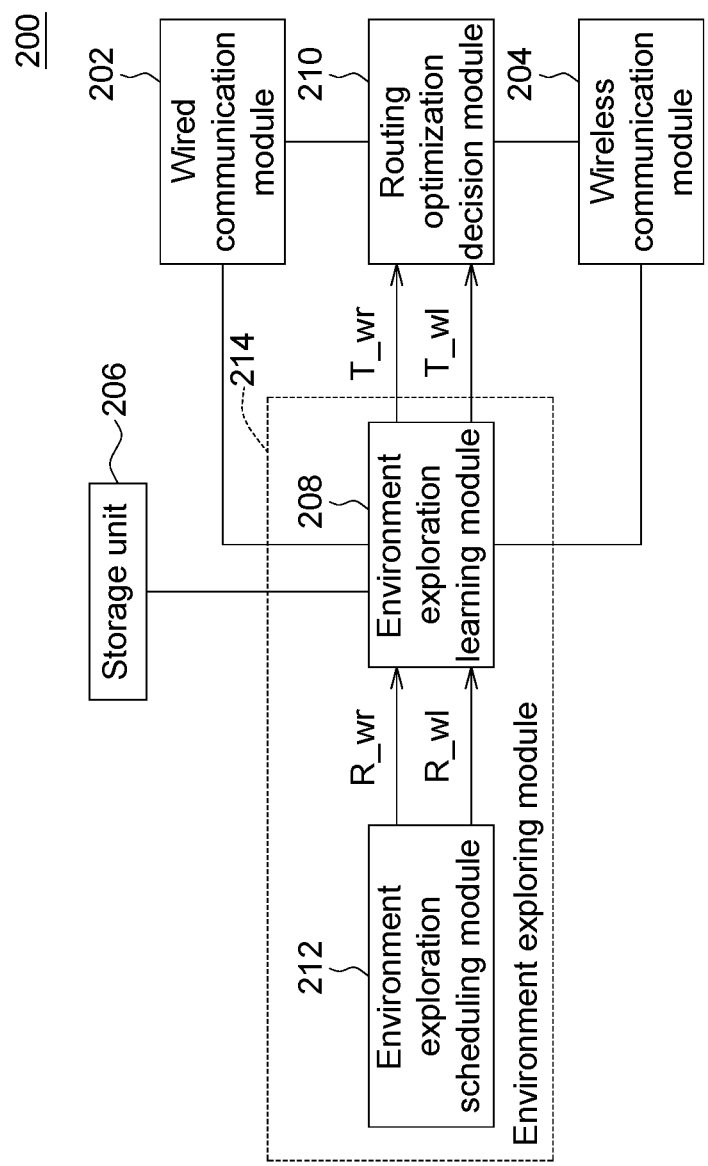
FIG. 2 is a block diagram of an example of a communication router with automatic routing establishment using the routing establishing method of FIG. 1.

Referring to FIG. 2, a block diagram of an example of a communication router 200 with automatic routing establishment using the routing establishing method of FIG. 1 is shown. The communication router 200 with automatic routing establishment is applied in a chain network, which includes a number of communication routers 200. One of the communication routers 200 includes a wired communication module 202, a wireless communication module 204, a storage unit 206, an environment exploration learning module 208, and a routing optimization decision module 210. The storage unit 206 is configured to store a device configuration file. The environment exploration learning module 208 is configured to perform a wired exploration procedure and a wireless exploration procedure. The wired exploration procedure performed by the environment exploration learning module 208 includes performing exploration according to the device configuration file through the wired communication module 202 to obtain a wired communication status between the communication router 200 and a destination communication router among the other communication routers in the chain network. The wireless exploration procedure performed by the environment exploration learning module 208 includes performing exploration according to the device configuration file through the wireless communication module 204 to obtain a wireless communication status between the communication router 200 and the destination communication router. The routing optimization decision module 210 is configured to perform a routing decision procedure, which includes determining and setting, according to the wired communication status and the wireless communication status, the next hop of the communication router 200 in a transmission routing from the communication router 200 to the destination communication router and whether the transmission routing is through the wired communication module 202 or the wireless communication module 204. The device configuration file includes device numbers related to relative positions of the communication routers in the chain network.

In the wired exploration procedure performed by the environment exploration learning module 208, when the environment exploration learning module 208 performs exploration according to the device configuration file through the wired communication module 202 and determines that the communication router 200 is capable of communicating with the destination communication router through the wired communication module 202, the environment exploration learning module 208 determines one of the other communication routers in the chain network as the next hop through which the communication router 200 transmits data to the destination communication router through the wired communication module 202.

In the wireless exploration procedure performed by the environment exploration learning module 208, when the environment exploration learning module 208 performs exploration according to the device configuration file through the wireless communication module 204 and determines that the communication router 200 is capable of communicating with the destination communication router through the wireless communication module 204, the environment exploration learning module 208 determines one of the other communication routers in the chain network as the next hop through which the communication router 200 transmits data to the destination communication router through the wireless communication module 204.

The storage unit 206 of the communication router 200 further stores at least one explosion routing table. In the present embodiment, the at least one explosion routing table includes a wired routing table and a wireless routing table. In the wired exploration procedure performed by the environment exploration learning module 208, the environment exploration learning module 208 records a device number and a communication module type of the other communication router determined as the next hop of the communication router 200 in the at least one explosion routing table, such as the wired routing table. In the wireless exploration procedure performed by the environment exploration learning module 208, the environment exploration learning module 208 records a device number and a communication module type of the other communication router determined as the next hop of the communication router 200 in the at least one explosion routing table, such as the wireless routing table. In other embodiment, the wired routing table and the wireless routing table can be integrated as a single routing table in which the information of the communication module type corresponds to the wired exploration procedure or the wireless exploration procedure.

In the routing decision procedure performed by the routing optimization decision module 210, the routing optimization decision module 210, according to at least one explosion routing table (for example, the wired routing table and the wireless routing table) and a routing optimization decision algorithm, sets the transmission routing of the communication router 200 to be through the wired communication module 202 and sets the next hop of the communication router 200 to be the other communication router determined as the next hop in the wired exploration procedure, or sets the transmission routing of the communication router 200 to be through the wireless communication module 204 and sets the next hop of the communication router 200 to be the other communication router determined as the next hop in the wireless exploration procedure.

The wired exploration procedure performed by the environment exploration learning module 208 further includes: testing, by the environment exploration learning module 208, whether the communication router 200 is capable of directly communicating with the destination communication router through the wired communication module 202; when the communication router 200 is capable of directly communicating with the destination communication router through the wired communication module 202, setting the destination communication router to be the next hop through which the communication router 200 transmits data to the destination communication router through the wired communication module 202; and when the communication router 200 is not capable of directly communicating with the destination communication router through the wired communication module 202 and the communication router 200 is capable of communicating with the destination communication router through the wired communication module 202 and at least one wired candidate router among the other communication routers in the chain network, setting the wired candidate router closest to the destination communication router to be the next hop through which the communication router 200 transmits data to the destination communication router through the wired communication module 202.

The wired exploration procedure performed by the environment exploration learning module 208 further includes: when the communication router 200 is not capable of directly communicating with the destination communication router through the wired communication module 202, determining, according to the device configuration file, the at least one wired candidate router among the other communication routers in the chain network with which the communication router 200 is capable of communicating through the wired communication module 202; testing whether the communication router 200 is capable of communicating with the destination communication router through the wired communication module 202 and at least one wired candidate router; and when the communication router 200 is capable of communicating with the destination communication router through the wired communication module 202 and at least one wired candidate router, setting the wired candidate router closest to the destination communication router to be the next hop through which the communication router 200 transmits data to the destination communication router through the wired communication module 202.

In the wireless exploration procedure performed by the environment exploration learning module 208, the communication router 200 determines the other communication router, which is capable of communicating with the destination communication router through the wireless communication module 204 and is closest to the communication router 200, as the next hop through which the communication router 200 transmits data to the destination communication router through the wireless communication module 204.

The wireless exploration procedure further includes: determining, by the environment exploration learning module 208 of the communication router 200 according to the device configuration file, a wireless candidate router closest to the communication router 200 among the other communication routers with which the communication router 200 is capable of communicating with through the wireless communication module 204; testing whether the communication router 200 is capable of communicating with the destination communication router through the wireless communication module 204 and the closest wireless candidate router; and when the communication router 200 is capable of communicating with the destination communication router through the wireless communication module 204 and the closest wireless candidate router, setting the closest wireless candidate router to be the next hop through which the communication router 200 transmits data to the destination communication router through the wireless communication module 204.

On the other hand, when the communication router 200 is not capable of communicating with the destination communication router through the wireless communication module 204 and the closest wireless candidate router, the communication router 200, according to the device configuration file, determines another wireless candidate router second closest to the communication router 200 among the other communication routers with which the communication router 200 is capable of communicating through the wireless communication module 204; the communication router 200 tests whether the communication router 200 is capable of communicating with the destination communication router through the wireless communication module 204 and the another second closest wireless candidate router. When the communication router 200 is capable of communicating with the destination communication router through the wireless communication module 204 and the another second closest wireless candidate router, the another second closest wireless candidate router is set to be the next hop through which the communication router 200 transmits data to the destination communication router through the wireless communication module 204. When the communication router 200 is not capable of communicating with the destination communication router through the wireless communication module 204 and the another second closest wireless candidate router, the steps of the present paragraph are repeated. In other words, the wireless exploration procedure is to sequentially determine or select a wireless candidate router among other communication routers according to the distance between each other communication router and the communication router 200 from the closest to the farthest until the wireless candidate router that can enable communication is determined or selected. That is, when the communication router 200 is capable of communicating with the destination communication router through the wireless communication module 204 and the determined or selected wireless candidate router, the determined or selected wireless candidate router is set to be the next hop.

The communication router 200 may further selectively include an environment exploration scheduling module 212 configured to determine exploration action and exploration cycle for the wired communication module and the wireless communication module. The environment exploration scheduling module 212 is configured to schedule the action of exploring the wired communication status and the wireless communication status between the communication router 200 and the destination communication router, that is, to schedule the wired exploration procedure and the wireless exploration procedure to determine the time point, the frequency or the cycle of the exploration procedure. For example, the environment exploration scheduling module 212 performs scheduling and outputs a scheduled wired communication exploration schedule R_wr and a scheduled wireless communication exploration schedule R_wl to the environment exploration learning module 208 in the wired exploration procedure and the wireless exploration procedure, respectively. The environment exploration learning module 208, according to the wired communication exploration schedule R_wr and the wireless communication exploration schedule R_wl, performs the wired exploration procedure and the wireless exploration procedure to construct a wired routing table T_wr and a wireless routing table T_wl. For example, the environment exploration learning module 208, according to the wired communication exploration schedule R_wr and the wireless communication exploration schedule R_wl, performs exploration procedure to obtain a wired routing table T_wr and a wireless routing table T_wl.

After the communication router 200 is activated, the environment exploration learning module 208 outputs the wired routing table T_wr and the wireless routing table T_wl to the routing optimization decision module 210 for the routing optimization decision module 210 to determine and set the routing. The wired routing table T_wr and the wireless routing table T_wl outputted by the environment exploration learning module 208 include the communication module in use and the device number of the next hop. For example, the environment exploration learning module 208 transmits the communication module in use (the wired communication module or the wireless communication module) and the next hop corresponding to each routing of the communication router 200 (for example, the next hop through which the communication router 200 transmits data to the destination communication router through the wired communication module or the wireless communication module) to the routing optimization decision module 210.

The routing optimization decision module 210, according and the wired routing table T_wr and the wireless routing table T_wl and the topology of the chain network, determines the routing to optimize system efficiency. For example, during the signal transmission stage, the routing optimization decision module 210, based on the topology of the chain network, can design a better routing according to the wired communication module in use and the corresponding next hop or according to the wireless communication module in use and the corresponding next hop. The routing refers to the signal transmission path between the communication router 200 and the destination communication router. For example, the signal transmission path includes the other communication routers between the communication router 200 and the destination communication router. For example, the routing optimization decision module 210 prioritizes the wired communication module for signal transmission. Thus, the communication router 200 can transmit data to the destination communication router through at least one of the wired communication module and the wireless communication module.

Selectively, the environment exploration learning module 208 and the environment exploration scheduling module 212 can form an environment exploring module 214. The communication router 200 can further be equipped with wireless access function and used as a wireless access point for connecting the user's wireless device to the Internet. Details of the routing establishing method of FIG. 1 and the communication router 200 of FIG. 2 are described below.

Figure 3:
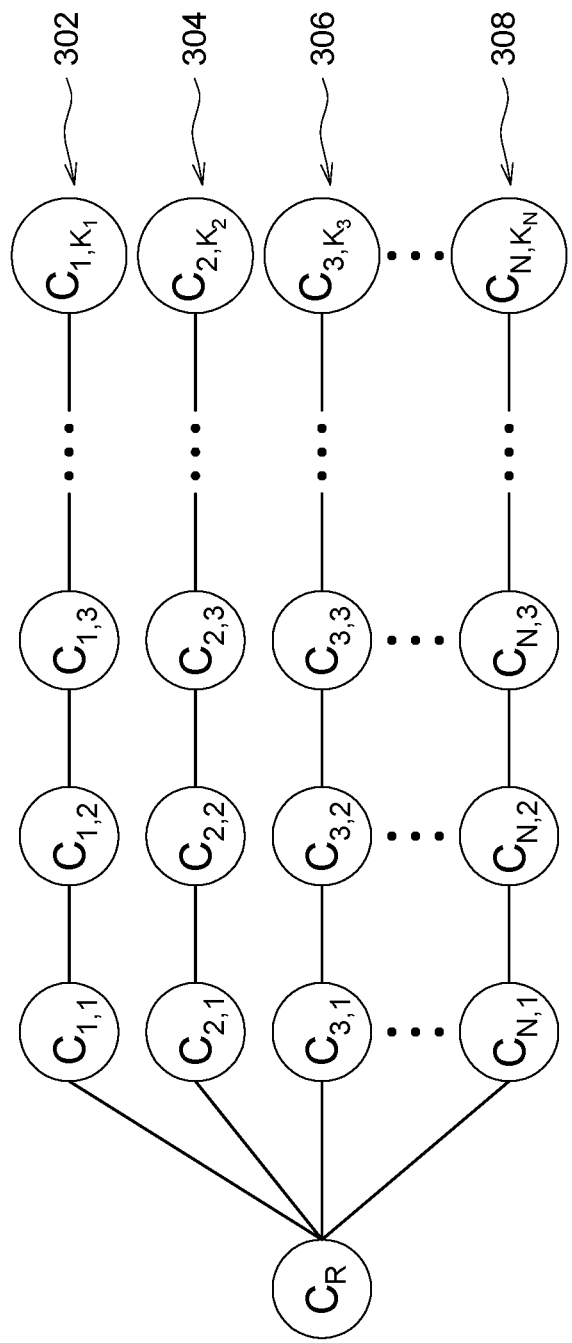
FIG. 3 is an example of a network architecture using the routing establishing method of FIG. 1.

Referring to FIG. 3, an example of a network architecture using the routing establishing method of FIG. 1 is shown. The network architecture of FIG. 3 is a chain topology, that is, the network architecture is a chain network 300. Suppose the chain network 300 has N chains in total, that is, the chain network 300 is N single-chain networks including a first single-chain network 302, a second single-chain network 304, a third single-chain network 306 . . . and an N-th single-chain network 308. The chain network 300 includes a number of communication routers, such as a communication router $C_R$, communication routers $C_{1,1}$, $C_{1,2}$, $C_{1,3}$, . . . $C_{1,K_1}$ in the first single-chain network 302, communication routers $C_{2,1}$, $C_{2,2}$, $C_{2,3}$, . . . $C_{2,K_2}$ in the second single-chain network 304, communication routers $C_{3,1}$, $C_{3,2}$, $C_{3,3}$, . . . $C_{3,K_3}$ in the third single-chain network 306, . . . , and communication routes $C_{N,1}$, $C_{N,2}$, $C_{N,3}$, . . . $C_{N,K_N}$ in the N-th single-chain network 308. $K_1$ refers to the quantity of devices in the first chain (the first single-chain network 302); $K_2$ refers to the quantity of devices in the second chain (the second single-chain network 304); $K_3$ refers to the quantity of devices in the third chain (the third single-chain network 306), and $K_N$ refers to the quantity of devices in the N-th chain (the N-th single-chain network 308). The attribute of each communication router is a root node or a leaf node. The communication router $C_R$ is a root node, and the remaining communication routers are leaf nodes. The root communication router $C_R$ is also the root node of the first single-chain network 302 to the N-th single-chain network 308. Each communication router can be used as the communication router 200, the other communication router or the destination communication router according to the embodiment of FIG. 2. The communication router used as the transmitter of the network packet is defined as the source communication router, and the communication node used as the receiver of the network packet is defined as the destination communication router.

In the chain network 300, the source communication router obtains the wired communication status and the wireless communication status between the source communication router and the destination communication router according to a device configuration file. The device configuration file can be stored in the source communication router or other device. The device configuration file can be, for example, downloaded from a control host through a user interface when the control host is booted. The device configuration file records device numbers related to relative positions of the communication routers in the chain network. The information recorded in the device configuration file further includes the quantity of single-chain networks in the chain network, the quantity of leaf node devices in each single-chain network, the device number of the leaf node devices in each single-chain network, the device number of a root node, the node type, and the single-chain number of the single-chain network to which the leaf node belongs.

Let the communication router $C_{1,1}$ in the first single-chain network 302 be taken for example. The information recorded in the device configuration file of the communication router $C_{1,1}$ includes the quantity of single-chain networks in the chain network (for example, the device configuration file of the communication router $C_{1,1}$ records the quantity N of single-chain networks in the chain network 300), the quantity of leaf node devices in each single-chain network (for example, the device configuration file of the communication router $C_{1,1}$ records the quantity $K_1$ of leaf node devices in the first single-chain network 302), the device number of the leaf node devices in each single-chain network (for example, the device configuration file of the communication router $C_{1,1}$ records corresponding device numbers of the communication routers $C_{1,1}$ to $C_{1,K_1}$ in the first single-chain network 302), the device number of the root node (for example, the device configuration file of the communication router $C_{1,1}$ records the device number of the root communication router $C_R$), the node type (for example, the device configuration file of the communication router $C_{1,1}$ records that the node type of the communication router $C_{1,1}$ is leaf node), and the single-chain number of the single-chain network to which the leaf node belongs (for example, the device configuration file of the communication router $C_{1,1}$ records that the single-chain number of the single-chain network to which the communication router $C_{1,1}$ belongs is 1).

The device configuration file also includes the device numbers of all communication routers in the corresponding single-chain network, and the device numbers are related to relative positions of the communication routers in the corresponding single-chain network. For example, the device number of the communication router $C_{1,1}$ is 1, indicating that the communication router $C_{1,1}$ is located at the first position following the root communication router $C_R$ in the first single-chain network 302. The device number of the communication router $C_{1,2}$ is 2, indicating that the communication router $C_{1,2}$ is located at the second position following the root communication router $C_R$ in the first single-chain network 302.

The next hop, through which the source communication router transmits data to the destination communication router through the wired communication module and determined in the wired exploration procedure performed by the source communication router according to the device configuration file through the wired communication module, is defined as the next hop of wired communication. The next hop, through which the source communication router transmits data to the destination communication router through the wireless communication module and determined in the wireless exploration procedure performed by the source communication router according to the device configuration file through the wireless communication module, is defined as the next hop of wireless communication.

The device number and the communication module type of the next hop of wired communication are recorded in the wired routing table, and the device number and the communication module type of the next hop of wireless communication are recorded in the wireless routing table. In the routing decision procedure, through the routing optimization decision algorithm, one of the next hop of wired communication and the next hop of wireless communication is selected and recorded in a routing optimization decision table. The source communication router transmits data to the destination communication router through the selected next hop of wired communication or next hop of wireless communication through the wired communication module or the wireless communication module. The source communication router, according to the wired routing table, the wireless routing table, and the routing optimization decision table, sets the transmission routing from the source communication router to the destination communication router to be transmitted through the wired communication module and sets the next hop of the source communication router to be the next hop of wired communication, or sets the transmission routing from the source communication router to the destination communication router to be transmitted through the wireless communication module and sets the next hop of the source communication router to be the next hop of wireless communication.

Figure 4:
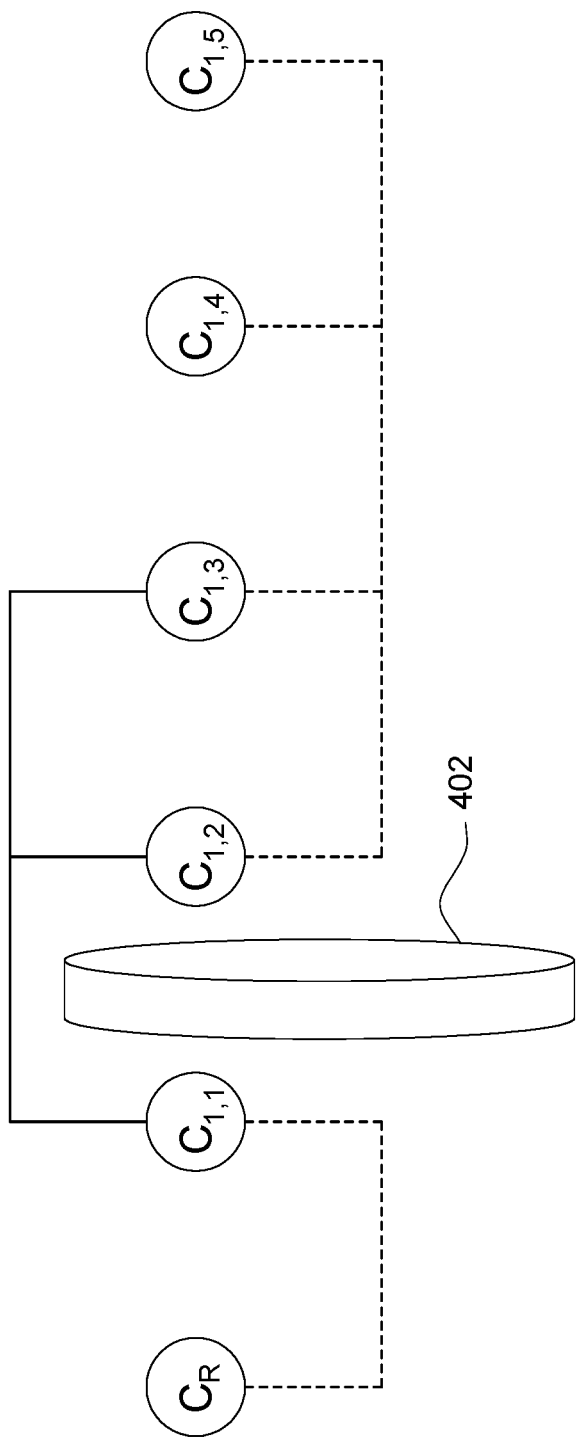
FIG. 4 is a schematic diagram of a communication status of one of the single-chain networks in a chain network using the routing establishing method of FIG. 1.

Referring to FIG. 4, a schematic diagram of a communication status of one of the single-chain networks in a chain network 300 using the routing establishing method of FIG. 1 is shown. The single-chain network 400 of FIG. 4 can be a single-chain network among the first single-chain network 302 to the N-th single-chain network 308, and FIG. 4 is exemplified by the first single-chain network 302. Suppose $K_1=5$, and the single-chain network 400 includes a root communication router $C_R$ and communication routers $C_{1,1}$ to $C_{1,5}$. It is assumed that the communication routers $C_{1,1}$ and $C_{1,2}$ are separated by a metal barrier 402. The solid line indicates wired connection, and the dotted line indicates wireless connection. For example, the root communication router $C_R$ and the communication router $C_{1,1}$ can communicate through wireless connection; the communication routers $C_{1,1}$ and $C_{1,2}$ can communicate through wired connection; the communication router $C_{1,2}$ and $C_{1,3}$ can communicate through wired connection and wireless connection; the communication routers $C_{1,3}$ and $C_{1,4}$ can communicate through wireless connection; the communication routers $C_{1,4}$ and $C_{1,5}$ can communicate through wireless connection. Before the wired exploration procedure and the wireless exploration procedure are performed, suppose the root communication router $C_R$ and the communication routers $C_{1,1}$ to $C_{1,5}$ both are ignorant of the existence of the metal barrier 402 and both do not know whether every two communication nodes can transmit data through wired connection or wireless connection.

Referring to FIGS. 5A to 5F, examples of wireless routing tables and wired routing tables for the arrangement that the single-chain network 400 of FIG. 4 is in a connection status are shown. FIG. 5A is a wired routing table for the arrangement that the communication router $C_{1,1}$ of FIG. 4 is used as the source communication router. FIG. 5B is a wireless routing table for the arrangement that the communication router $C_{1,1}$ of FIG. 4 is used as the source communication router. FIG. 5C is a wired routing table for the arrangement that the communication router $C_{1,2}$ of FIG. 4 is used as the source communication router. FIG. 5D is a wireless routing table for the arrangement that the communication router $C_{1,2}$ of FIG. 4 is used as the source communication router. FIG. 5E is a wired routing table for the arrangement that the root communication router $C_R$ of FIG. 4 is used as the source communication router. FIG. 5F is a wireless routing table for the arrangement that the root communication router $C_R$ of FIG. 4 is used as the source communication router. Each of the wireless routing table and the wired routing table has a "destination communication router" column, a "communication module type" column, and a "next hop" column. Each row records the device number of the communication router used as the "destination communication router" (for the convenience of description, hereinafter in the table the device number of the node is replaced by the node designation), the type of the communication module used for communication, and the next hop through which the communication router communicates with the "destination communication router" through wired communication or wireless communication. In other embodiment, the wired routing table and the wireless routing table can be integrated as a single routing table in which the information of the communication module type corresponds to the wired exploration procedure or the wireless exploration procedure.

The communication status between the source communication router and the destination communication router obtained by the source communication router performing explanation through the wired communication module in the wired exploration procedure is referred as "wired communication status". The communication status between the source communication router and the destination communication router obtained by the source communication router performing explanation through the wireless communication module in the wireless exploration procedure is referred as "wireless communication status".

Refer to FIG. 4 and FIG. 5A. In the wired exploration procedure, when exploration is performed with the arrangement that the communication node $C_{1,1}$ is used as the source communication router and the root communication router $C_R$ is used as the destination communication router, the communication router $C_{1,1}$ will first of all transmit an exploration packet through the wired communication module (for example, using a PIN instruction). In the exploration packet, the destination is set to be the address of the root communication router $C_R$. When the communication router $C_{1,1}$ receives a reply from the root communication router $C_R$, this indicates that the communication router $C_{1,1}$ can communicate with the root communication router $C_R$ through the wired communication module. When the communication router $C_{1,1}$ does not receive any reply from the root communication router $C_R$, this indicate that the communication router $C_{1,1}$ cannot communicate with the root communication router $C_R$ through the wired communication module.

When the communication router $C_{1,1}$ does not receive any reply from the root communication router $C_R$, the communication router $C_{1,1}$ determines that it cannot communicate with the root communication router $C_R$ through the wired communication module. In the wired exploration procedure, the communication router $C_{1,1}$ determines that it cannot communicate with the root communication router $C_R$ through the wired communication module. Therefore, as indicated in FIG. 5A, the "destination communication router" column of the wired routing table for the arrangement that the communication router $C_{1,1}$ is used as the source communication router does not record the communication router $C_R$.

When exploration is performed with the arrangement that the communication router $C_{1,1}$ is used as the source communication router and the communication router $C_{1,2}$ is used as the destination communication router, the communication router $C_{1,1}$ will first of all transmit an exploration packet to the communication router $C_{1,2}$ through the wired communication module. In the exploration packet, the destination is set to be the address of the communication router $C_{1,2}$. When the communication router $C_{1,1}$ receives a reply from the communication router $C_{1,2}$, this indicates that the communication router $C_{1,1}$ can communicate with the communication router $C_{1,2}$ through the wired communication module. In the wired exploration procedure, the communication router $C_{1,1}$ obtains a wired communication status in which the communication router $C_{1,1}$ can communicate with the communication router $C_{1,2}$ through the wired communication module. Therefore, as indicated in FIG. 5A, the "destination communication router" column of the wired routing table for the arrangement that the communication router $C_{1,1}$ is used as the source communication router records the communication router $C_{1,2}$. Based on the step (a1) of "testing whether the source communication router is capable of directly communicating with the destination communication router through the wired communication module" and the step (a2) of "when the source communication router is capable of directly communicating with the destination communication router through the wired communication module, setting the destination communication router to be the next hop through which the source communication router transmits data to the destination communication router through the wired communication module", the communication router $C_{1,1}$ used as the source communication router is capable of directly communicating with the communication router $C_{1,2}$ used as the destination communication router through the wired communication module, and the destination communication router (the communication router $C_{1,2}$) can be set to be the next hop through which the source communication router transmits data to the destination communication router through the wired communication module. That is, the "next hop" column of the data row corresponding to the communication router $C_{1,2}$ records the device code or the device number of the communication router $C_{1,2}$.

Similarly, when exploration is performed with the arrangement that the communication router $C_{1,1}$ is used as the source communication router and the communication router $C_{1,3}$ is used as the destination communication router, the communication router $C_{1,1}$ obtains a routing between the communication router $C_{1,1}$ and the communication router $C_{1,3}$, and the communication router $C_{1,1}$ further obtains a wired communication status in which the communication router $C_{1,1}$ can communicate with the communication router $C_{1,3}$ through the wired communication module. Therefore, as indicated in FIG. 5A, the "destination communication router" column of the wired routing table for the arrangement that the communication router $C_{1,1}$ is used as the source communication router records the device code or the device number of the communication router $C_{1,3}$. Moreover, it can be known from step (a1) and step (a2), since the communication router $C_{1,1}$ used as the source communication router can directly communicate with the communication router $C_{1,3}$ used as the destination communication router through the wired communication module, the next hop of wired communication can be set to be the communication router $C_{1,3}$ used as the destination communication router. Therefore, the "next hop" column of the data row corresponding to the communication router $C_{1,3}$ records the device code or the device number of the communication router $C_{1,3}$.

When exploration is performed with the arrangement that the communication router $C_{1,1}$ is used as the source communication router and the communication router $C_{1,4}$ is used as the destination communication router, the communication router $C_{1,1}$ will first of all transmit an exploration packet through the wired communication module. In the exploration packet, the destination is set to be the address of the communication router $C_{1,4}$. When the communication router $C_{1,1}$ does not receive any reply from the communication router $C_{1,4}$, the communication router $C_{1,1}$ determines that it cannot directly communicate with the communication router $C_{1,4}$ through the wired communication module. Then, the communication router $C_{1,1}$ transmits another exploration packet through the wired communication module. In the another exploration packet, the destination is set to be the address of the communication router $C_{1,4}$, and the relay node is set to be the communication router $C_{1,3}$ closest to the communication router $C_{1,4}$. Thus, the another exploration packet will firstly be transmitted to the communication router $C_{1,3}$, then the communication router $C_{1,3}$ will further transfer the another exploration packet to the communication router $C_{1,4}$. When the communication router $C_{1,3}$ receives a reply from the communication router $C_{1,4}$ and the communication router $C_{1,1}$ receives a reply from the communication router $C_{1,3}$ (such as the reply that the communication router $C_{1,4}$ has received the packet), the communication router $C_{1,1}$ will obtain a wired communication status in which the communication router $C_{1,1}$ can communicate with the communication router $C_{1,4}$ through the communication router $C_{1,3}$ and through the wired communication module (that is, the communication router $C_{1,1}$ can communicate with the communication router $C_{1,4}$ through the wired connection between the communication node $C_{1,1}$ and the communication node $C_{1,3}$). The communication router $C_{1,1}$ does not need to know whether the communication router $C_{1,3}$ and the communication router $C_{1,4}$ communicate with each other through wired connection or wireless connection.

The communication router $C_{1,1}$ and the communication router $C_{1,4}$ cannot communicate with each other without going through the communication node $C_{1,3}$ used as a relay node. Therefore, as indicated in FIG. 5A, the "destination communication router" column of the wired routing table for the arrangement that the communication router $C_{1,1}$ used as the source communication router records the communication router $C_{1,4}$. Based on step (a3) of "when the source communication router is not capable of directly communicating with the destination communication router through the wired communication module and is capable of communicating with the destination communication router through the wired communication module and at least one wired candidate router among the other communication routers, setting the wired candidate router closest to the destination communication route to be the next hop through which the source communication router transmits data to the destination communication router through the wired communication module", the communication router $C_{1,1}$ used as the source communication router can communicate with the destination communication router (the communication router $C_{1,4}$) through the wired communication module of the communication router $C_{1,1}$ and the communication router $C_{1,3}$ closest to the communication router $C_{1,4}$, and the next hop of wired communication is set to be the communication router $C_{1,3}$ closest to the destination communication router (the communication router $C_{1,4}$). Therefore, the "next hop" column of the data row corresponding to the communication router $C_{1,4}$ records the device code or the device number of the communication router $C_{1,3}$.

Similarly, when the wired exploration procedure is performed with the arrangement that the communication router $C_{1,1}$ is used as the source communication router and the communication router $C_{1,5}$ is used as the destination communication router, the communication router $C_{1,1}$ obtains a wired communication status in which the routing between the communication node $C_{1,1}$ and the communication node $C_{1,5}$ through the wired communication module of the communication node $C_{1,1}$ must pass through the communication router $C_{1,3}$ used as the next hop to relay data. That is, the communication node $C_{1,1}$ and the communication node $C_{1,5}$ communicate with each other by using the wired connection between the communication router $C_{1,1}$ and the communication router $C_{1,3}$ and the wireless connection between the communication router $C_{1,3}$ and the communication router $C_{1,5}$. Therefore, as indicated in FIG. 5A, the "destination communication router" column of the wired routing table for the arrangement that the communication router $C_{1,1}$ is used as the source communication router records the communication router $C_{1,5}$. Moreover, the "next hop" column of the data row corresponding to the communication router $C_{1,5}$ records the device code or the device number of the communication router $C_{1,3}$ according to the step (a3).

Refer to FIG. 4 and FIG. 5B. In the wireless exploration procedure, when the wireless exploration procedure is performed with the arrangement that the communication router $C_{1,1}$ is used as the source communication router and the root communication router $C_R$ is used as the destination communication router, the communication router $C_{1,1}$ obtains a wireless communication status in which the communication router $C_{1,1}$ can communicate with the root communication router $C_R$ through the wireless communication module. Therefore, as indicated in FIG. 5B, the "destination communication router" column of the wireless routing table for the arrangement that the communication router $C_{1,1}$ is used as the source communication router records the root communication router $C_R$. Moreover, based on the step (b1) of "testing whether the source communication router is capable of directly communicating with the destination communication router through the wireless communication module and at least one wireless candidate router among the other communication routers, and when the source communication router is capable of communicating with the destination communication router through the wireless communication module and at least one wireless candidate router among the other communication routers, setting the wireless candidate router closest to the source communication router to be the next hop through which the source communication router transmits data to the destination communication router through the wireless communication module", the step (b11) of "determining, by the source communication router according to the device configuration file, a wireless candidate router closest to the source communication router among the other communication routers with which the source communication router is capable of communicating through the wireless communication module", the step (b12) of "testing whether the source communication router is capable of communicating with the destination communication router through the wireless communication module and the wireless candidate router" and the step (b13) of "when the source communication router is capable of communicating with the destination communication router through the wireless communication module and the wireless candidate router, setting the wireless candidate router to be the next hop through which the source communication router transmits data to the destination communication router through the wireless communication module", the communication router $C_{1,1}$ used as the source communication router can communicate with the root communication router $C_R$ closest to the destination communication router through the wireless communication module, and the next hop of wireless communication between the source communication router and the destination communication router is set to be the root communication router $C_R$ closest to the source communication router. That is, the other communication router, which can communicate with the wireless communication module of the source communication router and is closest to the source communication router among other communication routers between the source communication router and the destination communication router, is determined as the next hop of wireless communication. Then, the "next hop" column of the data row corresponding to the root communication router $C_R$ records the device code or the device number of the root communication router $C_R$.

When the wireless exploration procedure is performed with the arrangement that the communication router $C_{1,1}$ is used as the source communication router and the communication router $C_{1,2}$ is used as the destination communication router, the communication router $C_{1,1}$ obtains a wireless communication status in which the communication router $C_{1,1}$ cannot communicate with the communication router $C_{1,2}$ through the wireless communication module. Therefore, as indicated in FIG. 5B, the "destination communication router" column of the wireless routing table for the arrangement that the communication router $C_{1,1}$ is used as the source communication router does not record the communication router $C_{2,1}$. Similarly, when the communication router $C_{1,1}$ is used as the source communication router, and the communication router $C_{1,3}$, the communication router $C_{1,4}$, and the communication router $C_{1,5}$ are respectively used as the destination communication router, the communication router $C_{1,1}$ cannot communicate with the communication router $C_{1,3}$, the communication router $C_{1,4}$, and the communication router $C_{1,5}$ through the wireless communication module. Therefore, as indicated in FIG. 5B, the "destination communication router" column of the wireless routing table for the arrangement that the communication router $C_{1,1}$ is used as the source communication node does not record the device codes or the device numbers of the communication router $C_{1,3}$, the communication router $C_{1,4}$, and the communication router $C_{1,5}$.

Refer to FIG. 4 and FIG. 5C. By the same analogy, when the wired exploration procedure is performed with the arrangement that the communication router $C_{1,2}$ is used as the source communication router and the root communication router $C_R$ is used as the destination communication router, the communication router $C_{1,2}$ obtains a wired communication status in which the communication router $C_{1,2}$ can communicate with the root communication node $C_R$ through the wired communication module and the relay of the communication router $C_{1,1}$. That is, the communication router $C_{1,2}$ can communicate with the root communication router $C_R$ by using the wired connection between the communication router $C_{1,2}$ and the communication router $C_{1,1}$ and the wireless connection between the communication router $C_{1,1}$ and the root communication router $C_R$. Therefore, as indicated in FIG. 5C, the "destination communication router" column of the wired routing table for the arrangement that the communication router $C_{1,2}$ is used as the source communication router records the root communication router $C_R$, and the "next hop" column of the data row corresponding to the root communication router $C_R$ records the device code or the device number of the communication router $C_{1,1}$.

When the wired exploration procedure is performed with the arrangement that the communication router $C_{1,2}$ is used as the source communication router and the communication router $C_{1,1}$ is used as the destination communication router, the communication router $C_{1,2}$ obtains a wired communication status in which the communication router $C_{1,2}$ can directly communicate with the communication router $C_{1,1}$ through the wired communication module. Therefore, as indicated in FIG. 5C, the "destination communication router" column of the wired routing table for the arrangement that the communication router $C_{1,2}$ is used as the source communication router records the communication router $C_{1,1}$, and the "next hop" column of the data row corresponding to the communication router $C_{1,1}$ records the device code or the device number of the communication router $C_{1,1}$.

When the wired exploration procedure is performed with the arrangement that the communication router $C_{1,2}$ is used as the source communication router and the communication router $C_{1,3}$ is used as the destination communication router, the communication router $C_{1,2}$ obtains a wired communication status in which the communication router $C_{1,2}$ can directly communicate with the communication router $C_{1,3}$ through the wired communication module. Therefore, as indicated in FIG. 5C, the "destination communication router" column of the wired routing table for the arrangement that the communication router $C_{1,2}$ is used as the source communication router records the communication router $C_{1,3}$, and the "next hop" column of the data row corresponding to the communication router $C_{1,3}$ records the device code or the device number of the communication router $C_{1,3}$.

Similarly, when the wired exploration procedure is performed with the arrangement that the communication router $C_{1,2}$ is used as the source communication router and the communication router $C_{1,4}$ is used as the destination communication router, the communication router $C_{1,2}$ obtains a wired communication status in which the communication router $C_{1,2}$ can communicate with the communication router $C_{1,4}$ through the wired communication module and the relay of the communication router $C_{1,3}$. That is, the communication router $C_{1,2}$ can communicate with the communication router $C_{1,4}$ by using the wired connection between the communication router $C_{1,2}$ and the communication router $C_{1,3}$ and the wireless connection between the communication router $C_{1,3}$ and the communication router $C_{1,4}$. Therefore, as indicated in FIG. 5C, the "destination communication router" column of the wired routing table for the arrangement that the communication router $C_{1,2}$ is used as the source communication router records the communication router $C_{1,4}$, and the "next hop" column of the data row corresponding to the communication router $C_{1,4}$ records the device code or the device number of the communication router $C_{1,3}$.

Similarly, when the wired exploration procedure is performed with the arrangement that the communication router $C_{1,2}$ is used as the source communication router and the communication router $C_{1,5}$ is used as the destination communication router, the communication router $C_{1,2}$ obtains a wired communication status in which the communication router $C_{1,2}$ can communicate with the communication router $C_{1,5}$ through the wired communication module and the relay of the communication router $C_{1,3}$. That is, the communication router $C_{1,2}$ can communicate with the communication router $C_{1,5}$ by using the wired connection between the communication router $C_{1,2}$ and the communication router $C_{1,3}$, the wireless connection between the communication router $C_{1,3}$ and the communication router $C_{1,4}$, and the wireless connection between the communication router $C_{1,4}$ and the communication router $C_{1,5}$. Therefore, as indicated in FIG. 5C, the "destination communication router" column of the wired routing table for the arrangement that the communication router $C_{1,2}$ is used as the source communication router records the communication router $C_{1,5}$, and the "next hop" column of the data row corresponding to the communication router $C_{1,5}$ records the device code or the device number of the communication router $C_{1,3}$.

Refer to FIG. 4 and FIG. 5D, when the wireless exploration procedure is performed with the arrangement that the communication router $C_{1,2}$ is used as the source communication router and the root communication router $C_R$ is used as the destination communication router, the communication router $C_{1,2}$ obtains a wireless communication status in which the communication router $C_{1,2}$ cannot communicate with the root communication router $C_R$ through the wireless communication module. Therefore, as indicated in FIG. 5D, when the communication router $C_{1,2}$ is used as the source communication router, the "destination communication router" column of the wireless routing table generated does not record the root communication router $C_R$. Similarly, when the communication router $C_{1,2}$ is used as the source communication router and the communication router $C_{1,1}$ is used as the destination communication router, the communication router $C_{1,2}$ cannot communicate with the communication router $C_{1,1}$ through the wireless communication module. Therefore, as indicated in FIG. 5D, the "destination communication router" column of the wireless routing table for the arrangement that the communication router $C_{1,2}$ is used as the source communication router does not record the communication router $C_{1,1}$.

When the wireless exploration procedure is performed with the arrangement that the communication router $C_{1,2}$ is used as the source communication router and the communication router $C_{1,3}$ is used as the destination communication router, the communication router $C_{1,2}$ obtains a wireless communication status in which the communication router $C_{1,2}$ can directly communicate with the communication router $C_{1,3}$ through the wireless communication module. Therefore, as indicated in FIG. 5D, the "destination communication router" column of the wireless routing table for the arrangement that the communication router $C_{1,2}$ is used as the source communication router records the communication router $C_{1,3}$, and the "next hop" column of the data row corresponding to the communication router $C_{1,3}$ records the device code or the device number of the communication router $C_{1,3}$.

When the wireless exploration procedure is performed with the arrangement that the communication router $C_{1,2}$ is used as the source communication router and the communication router $C_{1,4}$ is used as the destination communication router, the communication router $C_{1,2}$ obtains a wireless communication status in which the communication router $C_{1,2}$ can communicate with the communication router $C_{1,4}$ through the wireless communication module and the relay of the communication router $C_{1,3}$. That is, the communication router $C_{1,2}$ can communicate with the communication router $C_{1,4}$ by using the wireless connection between the communication router $C_{1,2}$ and the communication router $C_{1,3}$ and the wireless connection between the communication router $C_{1,3}$ and the communication router $C_{1,4}$. Therefore, as indicated in FIG. 5D, the "destination communication router" column of the wireless routing table for the arrangement that the communication router $C_{1,2}$ is used as the source communication router records the communication router $C_{1,4}$, and the "next hop" column of the data row corresponding to the communication router $C_{1,4}$ records the device code or the device number of the communication router $C_{1,3}$.

Refer to FIG. 5D. When the wireless exploration procedure is performed with the arrangement that the communication router $C_{1,2}$ is used as the source communication router and the communication router $C_{1,5}$ is used as the destination communication router, based on the step (b1) of "testing whether the source communication router is capable of directly communicating with the destination communication router through the wireless communication module and at least one wireless candidate router among the other communication routers, and when the source communication router is capable of communicating with the destination communication router through the wireless communication module and at least one wireless candidate router among the communication routers, setting the wireless candidate router closest to the source communication router to be the next hop through which the source communication router transmits data to the destination communication router through the wireless communication module", the communication router $C_{1,2}$ can communicate with the communication router $C_{1,5}$ through the wireless communication module and the relay of the communication router $C_{1,3}$ and the communication router $C_{1,4}$. That is, the communication router $C_{1,2}$ can communicate with the communication router $C_{1,5}$ by using the wireless connection between the communication router $C_{1,2}$ and the communication router $C_{1,3}$, the wireless connection between the communication router $C_{1,3}$ and the communication router $C_{1,4}$, and the wireless connection between the communication router $C_{1,4}$ and the communication router $C_{1,5}$. That is, when the source communication router (the communication router $C_{1,2}$) can communicate with the destination communication router (the communication router $C_{1,5}$) through at least one wireless candidate router among the other communication routers in the chain network (the communication router $C_{1,3}$ and the communication router $C_{1,4}$) through the wireless communication module, the wireless candidate router (the communication router $C_{1,3}$) closest to the source communication router (the communication router $C_{1,2}$) is set to be the next hop through which the source communication router (the communication router $C_{1,2}$) transmits data to the destination communication router (the communication router $C_{1,5}$) through the wireless communication module. Therefore, as indicated in FIG. 5D, when the communication router $C_{1,2}$ is used as the source communication router, the "next hop" column of the data row of the wireless routing table corresponding to the communication router $C_{1,5}$ records the device code or the device number of the communication router $C_{1,3}$.

Refer to FIG. 4 and FIG. 5E. When the wired exploration procedure is performed with the arrangement that the root communication router $C_R$ is used as the source communication router and the communication router $C_{1,1}$ is used as the destination communication router, the root communication router $C_R$ obtains a wired communication status in which the root communication router $C_R$ cannot communicate with the communication router $C_{1,1}$ through the wired communication module. Therefore, as indicated in FIG. 5E, the "destination communication router" column of the wired routing table for the arrangement that the communication router $C_R$ is used as the source communication router does not record the communication router $C_{1,1}$. Similarly, when the wired exploration procedure is performed with the arrangement that the root communication router $C_R$ is used as the source communication router, and the communication router $C_{1,2}$, the communication router $C_{1,3}$, the communication router $C_{1,4}$, or the communication router $C_{1,5}$ is used as the destination communication router, the root communication router $C_R$ obtains a wired communication status in which the root communication router $C_R$ cannot communicate with the communication router $C_{1,2}$, the communication router $C_{1,3}$, the communication router $C_{1,4}$, or the communication router $C_{1,5}$ through the wired communication module. Therefore, as indicated in FIG. 5E, the "destination communication router" column of the wired routing table for the arrangement that the communication router $C_R$ is used as the source communication router does not record any router.

Refer to FIG. 4 and FIG. 5F. In the wireless exploration procedure, when exploration is performed with the arrangement that the root communication router $C_R$ is used as the source communication router and the communication router $C_{1,1}$ is used as the destination communication router, the root communication router $C_R$ obtains a wireless communication status in which the root communication router $C_R$ can communicate with the communication router $C_{1,1}$ through the wireless communication module directly. Therefore, as indicated in FIG. 5F, the "destination communication router" column of the wireless routing table for the arrangement that the communication router $C_R$ is used as the source communication router records the communication router $C_{1,1}$. Moreover, the "next hop" column of the data row corresponding to the communication router $C_{1,1}$ records the device code or the device number of the communication router $C_{1,1}$.

Similarly, when the wireless exploration procedure is performed with the arrangement that the root communication router $C_R$ is used as the source communication router and the communication router $C_{1,2}$ is used as the destination communication router, the root communication router $C_R$ obtains a wireless communication status in which the root communication router $C_R$ can communicate with the communication router $C_{1,2}$ through the wireless communication module and the relay of the communication router $C_{1,1}$. That is, the root communication router $C_R$ can communicate with the communication router $C_{1,2}$ by using the wireless connection between the root communication router $C_R$ and the communication router $C_{1,1}$ and the wired connection between the communication router $C_{1,1}$ and the communication router $C_{1,2}$. Therefore, as indicated in FIG. 5F, the "destination communication router" column of the wireless routing table for the arrangement that the root communication router $C_R$ is used as the source communication router records the communication router $C_{1,2}$. Moreover, the "next hop" column of the data row corresponding to the communication router $C_{1,2}$ records the device code or the device number of the communication router $C_{1,1}$.

Similarly, when the wireless exploration procedure is performed with the arrangement that the root communication router $C_R$ is used as the source communication router and the communication router $C_{1,3}$ is used as the destination communication router, the root communication router $C_R$ obtains a wireless communication status in which the root communication router $C_R$ can communicate with the communication router $C_{1,3}$ through the wireless communication module and the relay of the communication router $C_{1,1}$ and the communication router $C_{1,2}$. That is, the root communication router $C_R$ can communicate with the communication router $C_{1,3}$ by using the wireless connection between the root communication router $C_R$ and the communication router $C_{1,1}$, the wired connection between the communication router $C_{1,1}$ and the communication router $C_{1,2}$, and the wired connection or wireless connection between the communication router $C_{1,2}$ and the communication router $C_{1,3}$. Therefore, as indicated in FIG. 5F, the "destination communication router" column of the wireless routing table for the arrangement that the root communication router $C_R$ is used as the source communication router records the communication router $C_{1,3}$. Moreover, the "next hop" column of the data row corresponding to the communication router $C_{1,3}$ records the device code or the device number of the communication router $C_{1,1}$.

Similarly, when the wireless exploration procedure is performed with the arrangement that the root communication router $C_R$ is used as the source communication router and the communication router $C_{1,4}$ is used as the destination communication router, the root communication router $C_R$ obtains a wireless communication status in which the root communication router $C_R$ can communicate with the communication router $C_{1,4}$ through the wireless communication module and the relay of the communication router $C_{1,1}$, the communication router $C_{1,2}$ and the communication router $C_{1,3}$ That is, the root communication router $C_R$ can communicate with the communication router $C_{1,4}$ by using the wireless connection between the root communication router $C_R$ and the communication router $C_{1,1}$, the wired connection between the communication router $C_{1,1}$ and the communication router $C_{1,2}$, the wired or wireless connection between the communication router $C_{1,2}$ and the communication router $C_{1,3}$, and the wireless connection between the communication router $C_{1,3}$ and the communication router $C_{1,4}$. Therefore, as indicated in FIG. 5F, the "destination communication router" column of the wireless routing table for the arrangement that the root communication router $C_R$ is used as the source communication router records the communication router $C_{1,4}$. Moreover, the "next hop" column of the data row corresponding to the communication router $C_{1,4}$ records the device code or the device number of the communication router $C_{1,1}$.

Similarly, when the wireless exploration procedure is performed with the arrangement that the root communication router $C_R$ is used as the source communication router and the communication router $C_{1,5}$ is used as the destination communication router, the root communication router $C_R$ obtains a wireless communication status in which the root communication router $C_R$ can communicate with the communication router $C_{1,5}$ through the wireless communication module and the relay of the communication routers $C_{1,1}$, $C_{1,2}$, $C_{1,3}$ and $C_{1,4}$. That is, the root communication router $C_R$ can communicate with the communication router $C_{1,5}$ by using the wireless connection between the root communication router $C_R$ and the communication router $C_{1,1}$, the wired connection between the communication router $C_{1,1}$ and the communication router $C_{1,2}$, the wired or wireless connection between the communication router $C_{1,2}$ and the communication router $C_{1,3}$, the wireless connection between the communication router $C_{1,3}$ and the communication router $C_{1,4}$, and the wireless connection between the communication router $C_{1,4}$ and the communication router $C_{1,5}$. Therefore, as indicated in FIG. 5F, the "destination communication router" column of the wireless routing table for the arrangement that the root communication router $C_R$ is used as the source communication router records the communication router $C_{1,5}$, and the "next hop" column of the data row corresponding to the communication router $C_{1,5}$ records the device code or the device number of the communication router $C_{1,1}$.

Referring to FIGS. 6A to 6C, examples of routing optimization decision tables generated by the routing optimization decision module 210 based on a routing optimization decision algorithm according to the wireless routing tables and the wired routing tables of FIGS. 5A to 5F for the single-chain network 400 are shown. FIG. 6A is a routing optimization decision table for the arrangement that the communication router $C_{1,1}$ is used as the source communication router according to the wired routing table of FIG. 5A for the arrangement that the communication router $C_{1,1}$ is used as the source communication router and the wireless routing table of FIG. 5B for the arrangement that the communication router $C_{1,1}$ is used as the source communication router. FIG. 6B is a routing optimization decision table for the arrangement that the communication router $C_{1,2}$ is used as the source communication router according to the wired routing table of FIG. 5C for the arrangement that the communication router $C_{1,2}$ is used as the source communication router and the wireless routing table of FIG. 5D for the arrangement that the communication router $C_{1,2}$ is used as the source communication route. FIG. 6C is a routing optimization decision table for the arrangement that the root communication router $C_R$ is used as the source communication router according to the wired routing table of FIG. 5E for the arrangement that the root communication router $C_R$ is used as the source communication router and the wireless routing table of FIG. 5F for the arrangement that the root communication router $C_R$ is used as the source communication router.

Suppose the routing optimization decision module 210 generates the routing optimization decision table with the arrangement that the priority of the wired communication module is higher than the priority of the wireless communication module. As indicated in FIG. 5A, when the destination communication router is the root communication router $C_R$, there is no next hop of wired communication passing through the wired communication module, therefore the routing optimization decision module 210 takes the next hop (the root communication router $C_R$) of FIG. 5B obtained when the destination communication router is set to be the root communication router $C_R$ and further lists the next hop in the routing optimization decision table of FIG. 6A for the arrangement that the communication router $C_{1,1}$ is used as the source communication router. As indicated in FIG. 5A, when the destination communication router is set to be the communication routers $C_{1,2}$, $C_{1,3}$, $C_{1,4}$, and $C_{1,5}$, there are next hops passing through the wired communication module, therefore the routing optimization decision module 210 takes the next hops (the communication routers $C_{1,2}$, $C_{1,3}$, $C_{1,3}$, and $C_{1,3}$) of FIG. 5A obtained when the destination communication router is set to be the communication routers $C_{1,2}$, $C_{1,3}$, $C_{1,4}$, and $C_{1,5}$ and further lists the next hops in the routing optimization decision table of FIG. 6A for the arrangement that the communication router $C_{1,1}$ is used as the source communication router.

Similarly, as indicated in FIG. 5C, in the cases that the destination communication router is set to be the communication routers $C_R$, $C_{1,1}$, $C_{1,3}$, $C_{1,4}$, and $C_{1,5}$, there are next hops passing through the wired communication module, therefore the routing optimization decision module 210 takes the next hops (the communication router $C_{1,1}$, $C_{1,1}$, $C_{1,3}$, $C_{1,3}$, and $C_{1,3}$) of FIG. 5C obtained when the destination communication node is set to be the communication routers $C_R$, $C_{1,1}$, $C_{1,3}$, $C_{1,4}$, and $C_{1,5}$ and further lists the next hops in the routing optimization decision table of FIG. 6B for the arrangement that the communication router $C_{1,2}$ is used as the source communication router.

Similarly, as indicated in FIG. 5E, when the destination communication router is set to be any communication router, there is no next hop passing through the wired communication module, therefore the routing optimization decision module 210 takes the next hop (the communication router $C_{1,1}$, $C_{1,1}$, $C_{1,1}$, $C_{1,1}$, and $C_{1,1}$) of FIG. 5F obtained when the destination communication router is set to be the communication routers $C_{1,1}$, $C_{1,2}$, $C_{1,3}$, $C_{1,4}$, and $C_{1,5}$ and further lists the next hops in the routing optimization decision table of FIG. 6C for the arrangement that the communication router $C_R$ is used as the source communication router.

Thus, after the environment exploration learning module 208 outputs the wired routing table T_wr and the wireless routing table T_wl to the routing optimization decision module 210, the routing optimization decision module 210 generates a corresponding routing optimization decision table to determine the routing establishment. For example, during the signal transmission stage, the routing optimization decision module 210 determines whether to transmit data to the destination communication router through the wired communication module or the wireless communication module of the source communication router according to the generated routing optimization decision table, and determines which communication node should the packet be transmitted to according to the next hop of transmission routing recorded in the routing optimization decision table, such that better routing can be obtained and the system efficiency can be optimized.

Before the wired exploration procedure and the wireless exploration procedure are performed, each communication router only has the information of its own device configuration file. Each communication router is ignorant of the communication environment status, for example, whether there is any metal barrier blocking wireless communication. After the wired exploration procedure and the wireless exploration procedure are performed, each communication router obtains the wired connection status and the wireless connection status between itself and other communication routers. Thus, during the signal transmission stage, each communication router, according to the routing optimization decision table generated in the routing decision procedure, obtains the next hop of transmission routing through which data is transmitted to the destination communication router. In a diversified manner, each communication router independently obtains its own wired routing table, wireless routing table, and routing optimization decision table, such that the routing for data transmission can be automatically generated and optimized without involving manual setting or adjustment, which is indeed very convenient and time saving.

Figure 7:
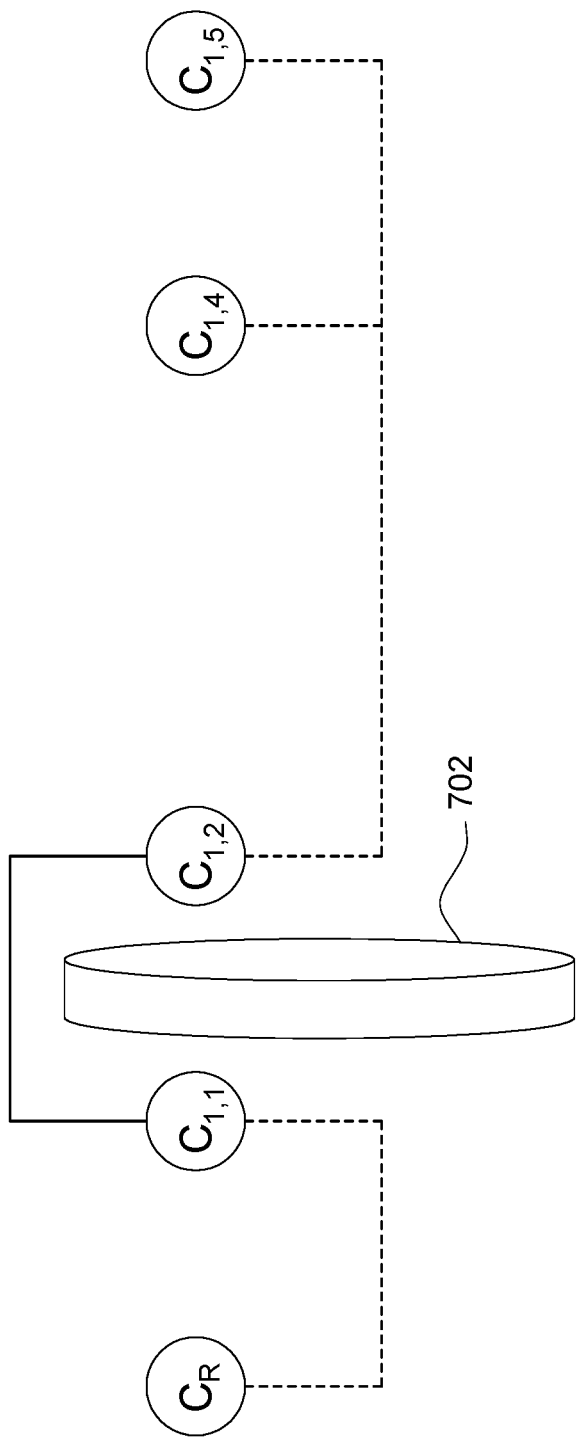
FIG. 7 is a schematic diagram of communication status when a communication router of the single-chain network of FIG. 4 is broken, removed or non-activated.

Referring to FIG. 7, a schematic diagram of communication status when a communication router of the single-chain network 400 of FIG. 4 is broken, removed or non-activated is shown. Suppose the communication router $C_{1,3}$ is broken, removed or non-activated (for example, the power is not turned on). Meanwhile, in the single-chain network 700, only the root communication router $C_R$ and the communication router $C_{1,1}$, $C_{1,2}$, $C_{1,4}$, and $C_{1,5}$ can communicate with each other, and the communication router $C_{1,1}$ and the communication router $C_{1,2}$ are separated by the metal barrier 702. Within the scheduled time, each of the communication routers $C_{1,1}$, $C_{1,2}$, $C_{1,4}$, and $C_{1,5}$ in the single-chain network 700, re-generates or updates respective wired routing table and wireless routing table according to the routing establishing method of FIG. 1. The following descriptions are exemplified by the communication router $C_{1,2}$ being used as the source communication router. FIG. 8A is a wired routing table for the arrangement that the communication router $C_{1,2}$ is used as the source communication router. FIG. 8B is a wireless routing table for the arrangement that the communication router $C_{1,2}$ is used as the source communication router. FIG. 8C is a routing optimization decision table for the arrangement that the communication router $C_{1,2}$ is used as the source communication router. As indicated in FIGS. 8A to 8C, even when the communication router $C_{1,3}$ is broken, removed or non-activated (for example, the power is not turned on) and therefore cannot function normally, each communication router in the single-chain network 700 still can automatically re-generate or update the wired routing table, the wireless routing table, and the routing optimization decision table, such that the single-chain network 700 still can find a new routing for signal transmission. There is no need to manually re-set wired transmission routing or wireless transmission routing for the communication routers, which is indeed very convenient and time saving.

Figure 9C:
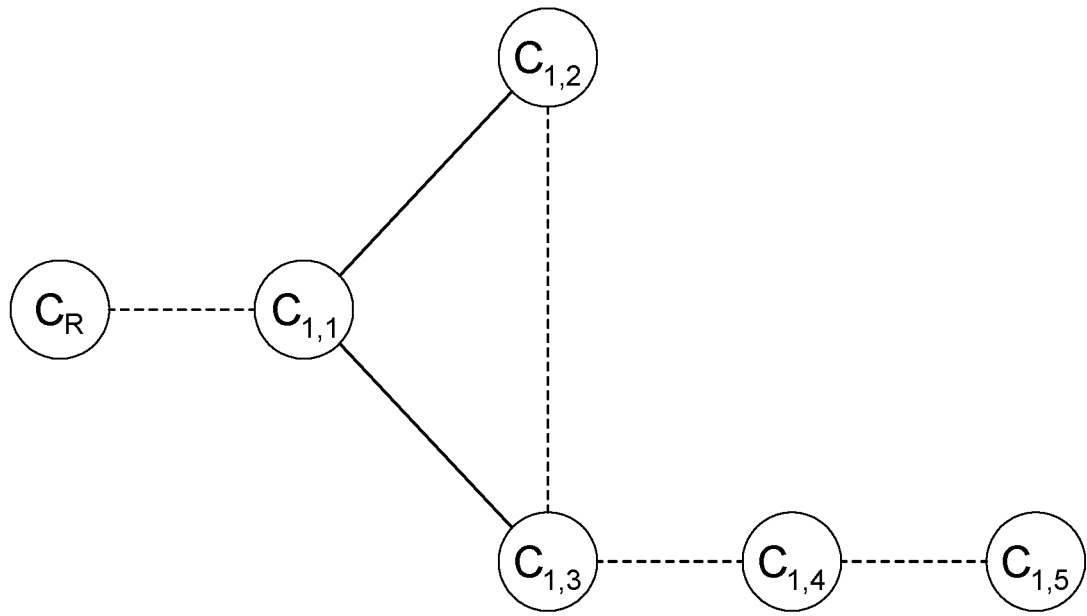

Referring to FIGS. 9A to 9C, equivalent network architecture diagrams of the single-chain network 400 of FIG. 4 are shown. FIG. 9A is an equivalent network architecture of the single-chain network 400 of FIG. 4 using wired connection. FIG. 9B is an equivalent network architecture of the single-chain network 400 of FIG. 4 using wireless connection. FIG. 9C is an equivalent network architecture diagram of the single-chain network 400 FIG. 4 using both wired connection and wireless connection.

In the single-chain network 400, suppose the root communication router $C_R$ and the communication router $C_{1,1}$ are located on the deck of a container ship; the communication router $C_{1,2}$, the communication router $C_{1,3}$, the communication router $C_{1,4}$, and the communication router $C_{1,5}$ are located in the under-deck channel of the container ship; and the root communication router $C_R$ and the communication router $C_{1,1}$ are separated from the communication router $C_{1,2}$, the communication router $C_{1,3}$, the communication router $C_{1,4}$, and the communication router $C_{1,5}$ by a metal deck. As indicated in FIG. 9A, when only wired connection is used for communication, the wired connection alone cannot make all communication routers communicate with each other. For example, the root communication router $C_R$, the communication router $C_{1,4}$, and the communication router $C_{1,5}$ cannot communicate with the communication router $C_{1,1}$, the communication router $C_{1,2}$, and the communication router $C_{1,3}$ through wired connection. As indicated in FIG. 9B, when only wireless connection is used for communication, the wireless connection alone cannot make all communication routers communicate with each other. For example, the root communication router $C_R$ and the communication router $C_{1,1}$ cannot communicate with the communication router $C_{1,2}$, the communication router $C_{1,3}$, the communication router $C_{1,4}$ and the communication router $C_{1,5}$ through wireless connection.

As indicated in FIG. 9C, when both wired connection and wireless connection are used, all communication routers can communicate with each other. For example, the root communication router $C_R$ and the communication router $C_{1,1}$ can communicate with each other though wireless connection; the communication router $C_{1,1}$ and the communication router $C_{1,2}$, which are respective located above and under the deck and are separated by a metal deck, can communicate with each other through wired connection. That is, wired network can cover wherever wireless connection cannot cover, and wireless network can cover wherever wired connection cannot cover, such that all communication routers can communicate with each other.

Figure 10:
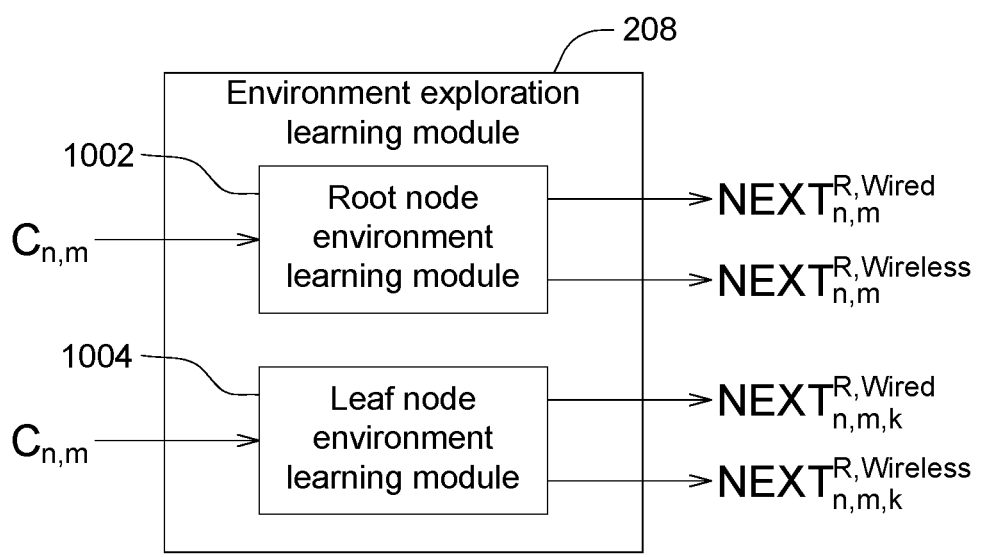
FIG. 10 is an example of the environment exploration learning module of FIG. 2.
Figure 11:
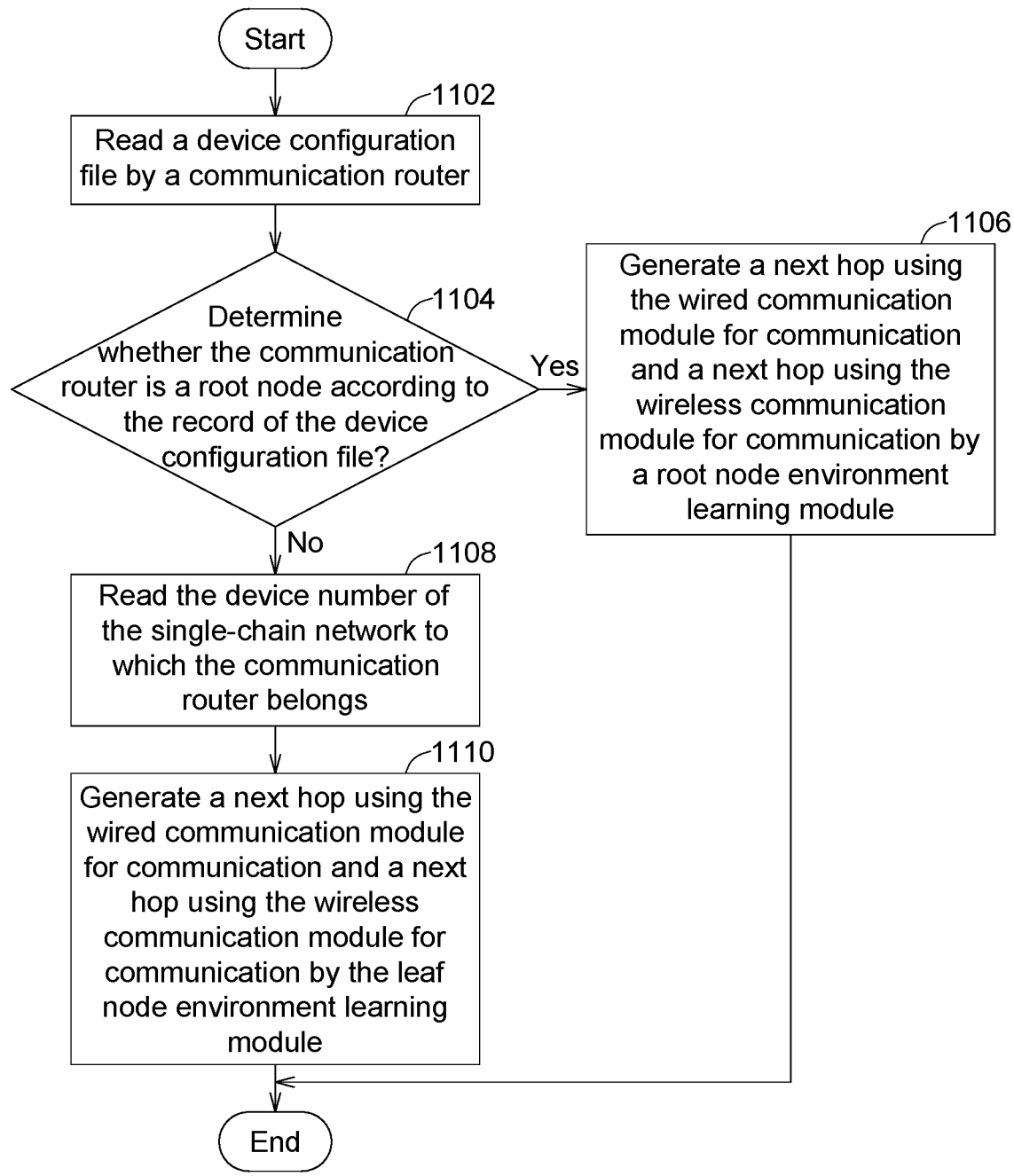
FIG. 11 is a flowchart of an example of the step of locating the next hop with which the communication router can communicate through a wired communication module and locating the next hop with which the communication router can communicate through a wireless communication module.

Details of the method for locating the next hop using the wired communication module for communication in the wired exploration procedure and the next hop using the wireless communication module for communication in the wireless exploration procedure are further described below. Refer to FIG. 10 and FIG. 11. FIG. 10 is an example of the environment exploration learning module 208 of FIG. 2. FIG. 11 is a flowchart of an example of the step of locating the next hop with which the communication router can communicate through a wired communication module in the wired exploration procedure and locating the next hop with which the communication router can communicate through a wireless communication module in the wireless exploration procedure. As indicated in FIG. 10, the environment exploration learning module 208 includes a root node environment learning module 1002 and a leaf node environment learning module 1004. As indicated in FIG. 11, the method for locating the next hop using the wired communication module for communication and the next hop using the wireless communication module for communication includes the following steps. Firstly, the method begins with step 1102, a device configuration file is read by a communication router. Then, the method proceeds to step 1104, whether the communication router is a root node is determined by the communication router according to the record of the device configuration file. If yes, then the method proceeds to step 1106; otherwise, the method proceeds to step 1108.

In step 1106, a next hop using the wired communication module for communication and a next hop using the wireless communication module for communication are generated by the root node environment learning module 1002. In step 1108, the device number of the single-chain network to which the communication router belongs is read by the communication router, and the method proceeds to step 1110. In step 1110, a next hop using the wired communication module for communication and a next hop using the wireless communication module for communication are generated by the leaf node environment learning module 1004.

The root node environment learning module 1002 and the leaf node environment learning module 1004, based on the device configuration file, respectively obtain the wired routing table T_wr and the wireless routing table T_wl of the communication router to other communication routers according to the wired communication exploration schedule R_wr and the wireless communication exploration schedule R_wl. The root communication router needs to generate the wired routing table T_wr and the wireless routing table T_wl for the communication routers of each single-chain in the chain network, and the leaf node only needs to generate the wired routing table T_wr and the wireless routing table T_wl relevant to other communication routers in the single-chain network to which the leaf node belongs.

In step 1106, details of an example of the method for generating, by the root node environment learning module 1002, the next hop using the wired communication module for communication and the next hop using the wireless communication module for communication are described. Suppose $I_{n,m}^{R,Wired}$ indicates the direct wired connection between the root communication router $C_R$ using the wired communication module and the communication router $C_{n,m}$, wherein $1 \leq n \leq N$, $0 \leq m \leq K_n$, that is, n is a positive integer smaller than or equivalent to N, m is a integer smaller than or equivalent to $K_n$ and greater than or equivalent to 0. Any chain of the N chains (N single-chain networks) is represented by the n-th chain, $K_n$ represents the device quantity of the n-th chain (that is, the device quantity of any of the first to the n-th chain). When the value of $I_{n,m}^{R,Wired}$ is equivalent to 1, this indicates that the root communication router $C_R$ can have direct wired connection with the communication router $C_{n,m}$. $I_{n,m}^{R,Wireless}$ indicates the direct wireless connection between the root communication router $C_R$ using the wireless communication module and the communication router $C_{n,m}$. When the value of $I_{n,m}^{R,Wireless}$ is equivalent to 1, this indicates that the root communication router $C_R$ can have direct wireless connection with the communication router $C_{n,m}$. The next hop through which the root communication router $C_R$ communicates with the communication router $C_{n,m}$ through the wired for communication module is represented as $NEXT_{n,m}^{R,Wired}$. The next hop through which the root communication router $C_R$ communicates with the communication router $C_{n,m}$ through the wireless communication module is represented as $NEXT_{n,m}^{R,Wireless}$. Parameter $K_{n,m}^{R,Wired}$ and parameter $K_{n,m}^{R,Wireless}$ are obtained firstly and expressed as equation 1 and equation 2 respectively:

$$K_{n,m}^{R,Wired} = \arg \max_{1 \leq k \leq m} \{k | I_{n,m}^{R,Wired} = 1\} \quad \text{(Equation 1)}$$

$$K_{n,m}^{R,Wired} = \arg \min_{1 \leq k \leq m} \{k | I_{n,m}^{R,Wired} = 1\} \quad \text{(Equation 2)}$$

That is, parameter $K_{n,m}^{R,Wired}$ represents the maximum integer k among the values of 1 to m satisfying $I_{n,m}^{R,Wired}=1$. Parameter $K_{n,m}^{R,Wireless}$ represents the minimum integer k among the values of 1 to m satisfying $I_{n,m}^{R,Wireless}=1$. Then, the next hop $NEXT_{n,m}^{R,Wired}$ through which the root communication router $C_R$ communicates with the communication router $C_{n,m}$ through the wired communication module and the next hop $NEXT_{n,m}^{R,Wireless}$ through which the root communication router $C_R$ communicates with the communication router $C_{n,m}$ through the wireless communication module are expressed as equation 3 and equation 4 respectively:

$$NEXT_{n,m}^{R,Wired} = C_{n,K_{n,m}^{R,Wired}} \quad \text{(Equation 3)}$$

$$NEXT_{n,m}^{R,Wireless} = C_{n,K_{n,m}^{R,Wireless}} \quad \text{(Equation 4)}$$

That is, in the n-th single-chain network, when the root communication router $C_R$ is used as the source communication router and the communication router $C_{n,m}$ is used as the destination communication router, the next hop $NEXT_{n,m}^{R,Wired}$ through which the communication router $C_R$ communicates with the communication router $C_{n,m}$ through the wired communication module is set to be the communication router $C_{n,k}$, wherein k is the maximum among the values of 1 to m in the communication routers having direct wired connection with the root communication router $C_R$. That is, the next hop is the communication router farthest away from the root communication router $C_R$. In other words, the next hop is the communication router closest to the communication router $C_{n,m}$ used as the destination communication router. The next hop $\text{NEXT}_{n,m}^{R,Wireless}$ through which the root communication router $C_R$ communicates with the communication router $C_{n,m}$ through the wireless communication module can be set to be the communication router $C_{n,k}$, wherein k is the minimum among the values of 1 to m in the communication routers having direct wireless connection with the root communication router $C_R$. That is, the next hop is the communication router closest to the root communication router $C_R$ used as the source communication router.

In step 1110, details of an example of generating, by the leaf node environment learning module 1004, the next hop using the wired communication module for communication and the next hop using the wireless communication module for communication are described below. Suppose $I_{n,m,k}^{Wired}$ indicates the direct wired connection status between the communication router $C_{n,m}$ and the communication router $C_{n,k}$, wherein m≠k, 1≤m, k≤$K_n$. When $I_{n,m,k}^{Wired}$ is equivalent to 1, this indicates that the communication router $C_{n,m}$ and the communication router $C_{n,k}$ can be connected through direct wired connection. $I_{n,m,k}^{Wireless}$ indicates the direct wireless connection status between the communication router $C_{n,m}$ and the communication router $C_{n,k}$. When $I_{n,m,k}^{Wireless}$ is equivalent to 1, this indicates that the communication router $C_{n,m}$ and the communication router $C_{n,k}$ can be connected through direct wireless connection. The next hop through which the communication router $C_{n,m}$ communicates with the communication router $C_{n,k}$ through the wired communication module is represented as $\text{NEXT}_{n,m,k}^{Wired}$. The next hop through which the communication router $C_{n,m}$ communicates with the communication router $C_{n,k}$ through the wireless communication module is represented as $\text{NEXT}_{n,m,k}^{Wireless}$. Parameter $K_{n,m,k}^{Wired}$ and parameter $K_{n,m,k}^{Wireless}$ are firstly obtained and expressed as equation 5 and equation 6 respectively:

$$K_{n,m,k}^{Wired} = \arg\max_{0\leq l \leq K_n}\{|m-l|(l-k)<0, I_{n,m,l}^{Wired}=1\} \quad \text{(Equation 5)}$$

$$K_{n,m,k}^{Wireless} = \arg\min_{0\leq l \leq k_n}\{|m-l|(l-m)/(l-k)<0, I_{n,m,l}^{Wireless}=1\} \quad \text{(Equation 6)}$$

That is, parameter $K_{n,m,k}^{Wired}$ represents the value l among the values of 1 to $K_n$ making the value of |m−l| the maximum when $I_{n,m,l}^{Wired}=1$ (l is between m and k). Parameter $K_{n,m,k}^{Wireless}$ represents the value l among the values of 1 to $K_n$ making the value of |m−l| the minimum when $I_{n,m,l}^{Wired}=1$ (l is between m and k). Then, the next hop $\text{NEXT}_{n,m,k}^{Wired}$ through which the communication router $C_{n,m}$ communicates with the communication router $C_{n,k}$ through the wired communication module and the next hop $\text{NEXT}_{n,m,k}^{Wireless}$ through which the communication router $C_{n,m}$ communicates with the communication router $C_{n,k}$ through the wireless communication module are expressed as equation 7 and equation 8 respectively:

$$\text{NEXT}_{n,m,k}^{Wired} = C_{n,K_{n,m,k}^{Wired}} \quad \text{(Equation 7)}$$

$$\text{NEXT}_{n,m,k}^{Wireless} = C_{n,K_{n,m,k}^{Wireless}} \quad \text{(Equation 8)}$$

That is, in the n-th single-chain network, when the communication router $C_{n,m}$ is used as the source communication router and the communication router $C_{n,k}$ is used as the destination communication router, the next hop $\text{NEXT}_{n,m,k}^{Wired}$ through which the communication router $C_{n,m}$ communicates with the communication router $C_{n,k}$ through the wired communication module is set to be the communication router $$C_{n,K_{n,m,k}^{Wired}},$$

which is located between the communication router $C_{n,m}$ and the communication router $C_{n,k}$ and is farthest away from the communication router $C_{n,m}$ among the communication routers having direct wired connection with the communication router $C_{n,m}$. The next hop $\text{NEXT}_{n,m,k}^{Wireless}$ through which the communication router $C_{n,m}$ communicates with the communication router $C_{n,k}$ through the wireless communication module is set to be the communication router $$C_{n,K_{n,m,k}^{Wireless}},$$

which is located between the communication router $C_{n,m}$ and the communication router $C_{n,k}$ and is closest to the communication router $C_{n,m}$ among the communication routers having direct wired connection with the communication router $C_{n,m}$.

Figure 12A:
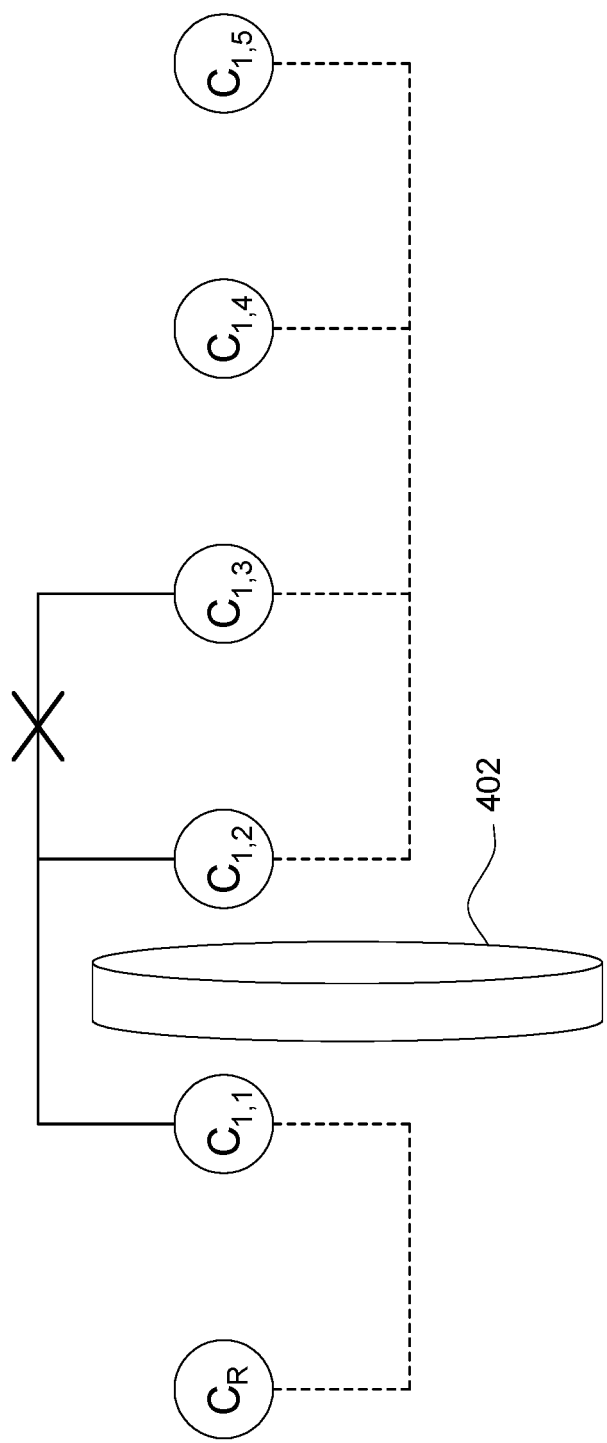
FIG. 12A and FIG. 12B are schematic diagrams of the single-chain network of FIG. 4 when wired connection is broken.
Figure 12B:
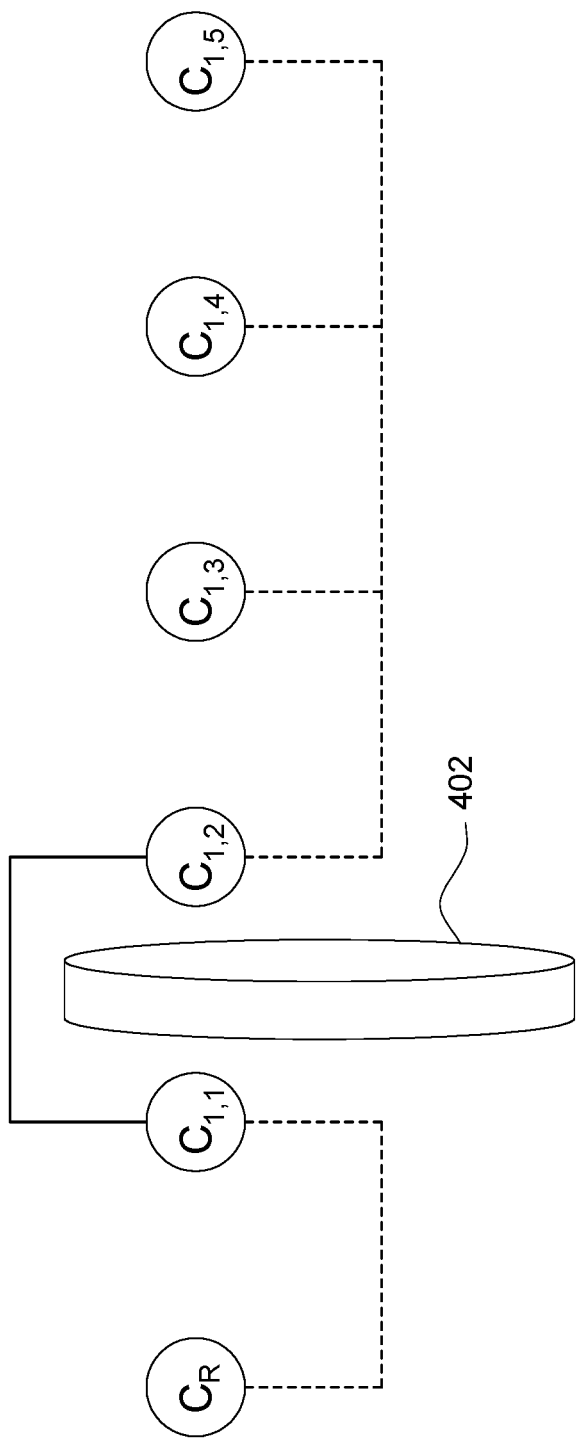

Referring to FIG. 12A and FIG. 12B, schematic diagrams of single-chain network 400 of FIG. 4 when wired connection is broken are shown. Also refer to FIG. 2. When the environment exploration scheduling module 212 performs periodic scheduling and periodically generates a wired communication exploration schedule R_wr and a wireless communication exploration schedule R_wl to explore whether wired connection and wireless connection exist, then the environment exploration learning module 208 can periodically generate or update the wired routing table T_wr and the wireless routing table T_wl and further provide the periodically generated or updated wired routing table T_wr and wireless routing table T_wl to the routing optimization decision module 210. Therefore, at a particular time point, if a particular communication router in the transmission path is broken or the channel does not allow communication, then the environment exploration learning module 208, according to the wired communication exploration schedule R_wr and the wireless communication exploration schedule R_wl transmitted from the environment exploration scheduling module 212, can obtain the message that the communication router is broken or the channel does not allow communication and further provide the updated wired routing table T_wr and wireless routing table T_wl to the routing optimization decision module 210. The routing optimization decision module 210, according to the wired routing table T_wr and the wireless routing table T_wl outputted from the environment exploration learning module 208, can dynamically update the setting of the routing. Thus, the chain network can provide autonomous backup for the communication nodes.

As indicated in FIG. 12A, if the wired connection between the communication router $C_{1,2}$ and the communication router $C_{1,3}$ in the single-chain network 1200 is broken and network transmission cannot be performed, then the connection status in the single-chain network 1200 will change to the connection status of the single-chain network 1202 as indicated in FIG. 12B. Meanwhile, the communication routers relevant to the single-chain network 1202 will again automatically perform the wired exploration procedure to locate the next hop using the wired communication module for communication for each communication router and perform the wireless exploration procedure will locate the next hop using the wireless communication module for communication for each communication router. Therefore, even when the wired network connection or the wireless network connection in the chain network is broken, the chain network will automatically update the wired routing table and the wireless routing table. Thus, when network transmission is performed again, the updated next hop using the wired communication module for communication and the next hop using the wireless communication module for communication recorded in the wired routing table and the wireless routing table will be found out directly, and normal transmission will be resumed. In comparison to the conventional method, which requires the network engineers to check the network status on site to find out the failure point or may even require manual resetting of the device configuration file, the embodiment of the present disclosure has the advantages of automatic re-connection, easy troubleshooting and time saving.

Referring to FIG. 13, a schematic diagram of an example of an embodiment of the present disclosure used in a long and narrow cabin is shown. The long and narrow cabin 1300 can be divided into several sections, such as section S1, section S2, section S3, and section S4. Each section is, for example, provided with an independent power system, and the power lines in different sections are not connected to each other. For example, the communication routers 1304(1) to 1304(3) in section S1 can be connected to each other through power line communication connection (wired communication connection), but the communication router 1304(4) in the section S2 cannot be connected to the communication routers 1304(1) to 1304(3) through wired communication connection (power line communication). When constructing network system in the long and narrow cabin, it is not easy to install additional physical transmission lines or configure new power lines. To resolve the problem that the communication router 1304(4) cannot be connected to the communication routers 1304(1) to 1304(3), wireless communication connection (for example, Wi-Fi communication module) can be constructed to connect the communication router 1304(3) and the communication router 1304(4). Thus, the communication router 1304(4) can communicate with the root communication router 1302 through the communication routers 1304(1) to 1304(3).

Figure 14A:
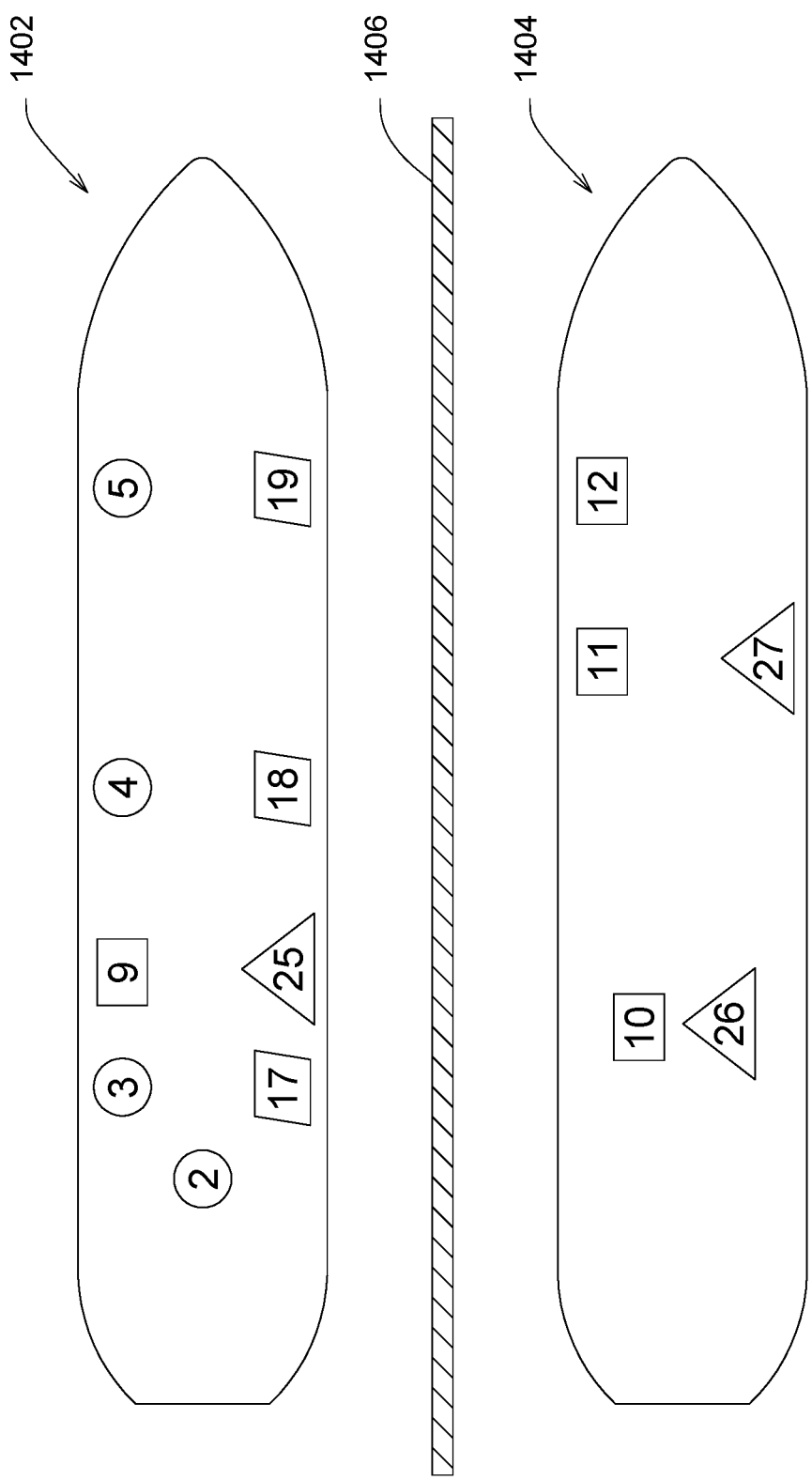
FIG. 14A and FIG. 14B are schematic diagrams of an example of an embodiment of the present disclosure used in a large ship with a deck area and an under-deck channel.
Figure 14B:
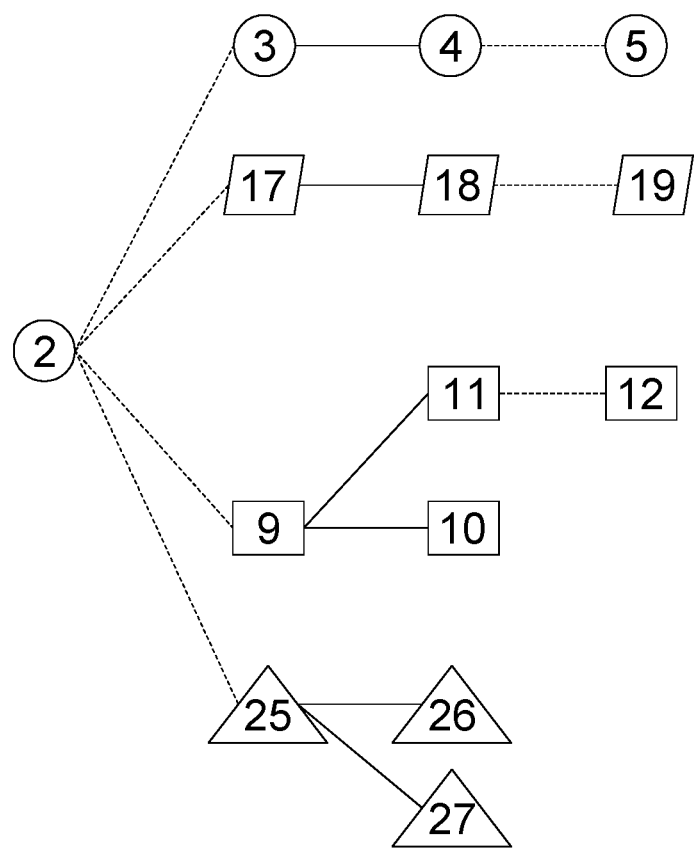

Referring to FIG. 14A and FIG. 14B, schematic diagrams of an example of an embodiment of the present disclosure used in a large ship with a deck area and an under-deck channel are shown. FIG. 14A is a schematic diagram of an example of the positions of the communication routers configured in the deck area and the under-deck channel. FIG. 14B is a schematic diagram of an example of equivalent chain network after the communication routers are configured in the deck area and the under-deck channel. The embodiment of the present disclosure has the advantage that the network can be quickly established. The establishment of a backbone network in a similar environment considers the following factors: (1) the space for the establishment of network is long, narrow and closed (for example, an under-deck channel); (2) the metal barrier between the under-deck channel and the deck area is harmful to the wireless transmission of the backbone devices in the deck area and the under-deck channel; (3) physical transmission lines are avoided as much as possible to reduce establishment cost; (4) the strategy of remote planning and on-site deployment reduces the technical threshold in the establishment of network.

Based on the above considerations, communication routers 2, 3, 9, 4, 5, 17, 25, 18, and 19 are configured in the deck area 1402 of FIG. 14A, and communication routers 10, 11, 12, 26, and 27 are configured in the under-deck channel 1404. The deck area 1402 and the under-deck channel 1404 are separated by a metal divider 1406 (for example, a metal deck); the communication routers 10, 11 and 12 and the communication routers 26 and 2 are also separated by the metal divider 1406. As indicated in FIG. 14B, the communication router 2 is a root communication router; the communication routers 3, 4 and 5 form a single-chain network; the communication routers 17, 18 and 19 form a single-chain network; the communication routers 9, 11 and 12 form a single-chain network; the communication routers 9 and 10 form a single-chain network; the communication routers 25 and 26 form a single-chain network; the communication routers 25 and 27 form a single-chain network. Solid lines represent wired connection, and dotted lines represent wireless connection. For example, the communication router 9 configured in the deck area 1402 and the communication router 10 configured in the under-deck channel 1404 can be connected through wired connection; the communication router 9 configured in the deck area 1402 and the root communication router 2 can be connected through wireless connection.

As indicated in FIG. 14A and FIG. 14B, the backbone network system configured in the cabin can perform wired connection communication using existing power lines of the ship. The use of wired connection communication (for example, power line communication) not only extends the scope of communication to cover the whole ship, but also has the advantage low deployment cost and easy installation no matter the ship is under construction or is already in service. However, power line communication is susceptible to the interference of load change and may even be interrupted. Furthermore, several independent circuits of power lines may not be able to communicate with each other. Besides, wireless (Wi-Fi mesh) transmission may easily be blocked by metal and therefore cannot cover the whole ship. The backbone transmission network of an embodiment of the present disclosure autonomously integrates wireless communication and wired communication to form a mixed-type backbone transmission network, and therefore the network coverage can cover the whole ship. Moreover, the dual-mode (wired network and wireless network) operation provides transmission backup function, which automatically switches the routing to maintain normal operation of network communication when malfunction occurs.

Therefore, the embodiment of the present disclosure has the following features: (1) the design of topology architecture (for example, the chain network) is simply, such that the network engineers can conveniently and quickly plan for the long, narrow and closed site; (2) the transmission method with autonomous planning of routing is based on the chain network, therefore the network engineers only need to set the device configuration file for the communication routers of the backbone network devices, and after the site personnel configure the communication routers in the site according to the planning, each communication router will automatically perform the wired exploration procedure and the wireless exploration procedure to generate the wired routing table and the wireless routing table for the autonomous networking of the chain network; (3) the dual-mode (wired network and wireless network) chain network provides excellent transmission backup, which enhances system robustness and enables the system to quickly recover from breakdowns.

As disclosed above, the embodiments of the present disclosure are capable of resolving the problems of the network establishment in a long, narrow and closed space being too difficult, the maintenance being too time consuming and the establishment cost being too high and make the network system easy to establish. Moreover, when the network system malfunctions, the system can automatically plan the connection status and automatically clear the malfunction.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A routing establishing method, for constructing a routing of a router chain network, which comprises a plurality of communication routers, wherein each of communication routers includes two routing tables for the router chain network including a wired routing table for the router chain network and a wireless routing table for the router chain network, each of the routing tables for the router chain network records at least one destination communication router and a next hop router corresponding thereto, the communication routers comprises a source communication router and a plurality of other communication routers, the routing establishing method is applied in the source communication router, which comprises a wired communication module, a wireless communication module, and a device configuration file, and the routing establishing method comprises:

a wired exploration procedure, performed by the source communication router according to the device configuration file through the wired communication module to obtain a wired communication status between the source communication router and the destination communication router among the other communication routers;

a wireless exploration procedure, performed by the source communication router according to the device configuration file through the wireless communication module to obtain a wireless communication status between the source communication router and the destination communication router; and a routing decision procedure, performed by the source communication router to determine and set, according to the wired communication status and the wireless communication status, a transmission routing from the source communication router to the destination communication router is through the wired communication module or the wireless communication module and the next hop router of the source communication router in the transmission routing, wherein the device configuration file comprises device numbers related to relative positions of the communication routers in the router chain network.

2. The routing establishing method according to claim 1, wherein in the wired exploration procedure, when the source communication router performs exploration according to the device configuration file through the wired communication module and determines that the source communication router is capable of communicating with the destination communication router through the wired communication module, the source communication router determines one of the other communication routers as the next hop router through which the source communication router transmits data to the destination communication router through the wired communication module;

wherein in the wireless exploration procedure, when the source communication router performs exploration according to the device configuration file through the wireless communication module and determines that the source communication router is capable of communicating with the destination communication router through the wireless communication module, the source communication router determines one of the other communication routers as the next hop router through which the source communication router transmits data to the destination communication router through the wireless communication module.

3. The routing establishing method according to claim 2, wherein the source communication router further comprises at least one explosion routing table, and in the wired exploration procedure, a device number and a communication module type of the other communication router determined as the next hop router of the source communication router are recorded in the at least one explosion routing table;

wherein in the wireless exploration procedure, a device number and a communication module type of the other communication router determined as the next hop router of the source communication router are recorded in the at least one explosion routing table;

wherein in the routing decision procedure, the source communication router, according to the at least one explosion routing table and a routing optimization decision algorithm, sets the transmission routing of the source communication router to be through the wired communication module and sets the next hop router of the source communication router to be the other communication router determined as the next hop router in the wired exploration procedure, or sets the transmission routing of the source communication router to be through the wireless communication module and sets the next hop router of the source communication router to be the other communication router determined as the next hop router in the wireless exploration procedure.

4. The routing establishing method according to claim 3, wherein in the wired exploration procedure, the step of determining, by the source communication router, one of the other communication routers as the next hop router through which the source communication router transmits data to the destination communication router through the wired communication module comprises:

testing whether the source communication router is capable of directly communicating with the destination communication router through the wired communication module;

when the source communication router is capable of directly communicating with the destination communication router through the wired communication module, setting the destination communication router to be the next hop router through which the source communication router transmits data to the destination communication router through the wired communication module; and when the source communication router is not capable of directly communicating with the destination communication router through the wired communication module and is capable of communicating with the destination communication router through the wired communication module and at least one wired candidate router among the other communication routers, setting the wired candidate router closest to the destination communication router to be the next hop router through which the source communication router transmits data to the destination communication router through the wired communication module.

5. The routing establishing method according to claim 4, wherein the step of setting the wired candidate router closest to the destination communication router to be the next hop router through which the source communication router transmits data to the destination communication router through the wired communication module comprises:
when the source communication router is not capable of directly communicating with the destination communication router through the wired communication module, determining, by the source communication router according to the device configuration file, the at least one wired candidate router among the other communication routers with which the source communication router is capable of communicating through the wired communication module;
testing whether the source communication router is capable of communicating with the destination communication router through the wired communication module and the at least one wired candidate router; and
when the source communication router is capable of communicating with the destination communication router through the wired communication module and the at least one wired candidate router, setting the wired candidate router closest to the destination communication router to be the next hop router through which the source communication router transmits data to the destination communication router through the wired communication module.

6. The routing establishing method according to claim 3, wherein in the wireless exploration procedure, the source communication router determines the other communication router, which is capable of communicating with the destination communication router and is closest to the source communication router among the other communication routers with which the source communication router is capable of communicating through the wireless communication module, as the next hop router through which the source communication router transmits data to the destination communication router through the wireless communication module.

7. The routing establishing method according to claim 6, wherein the step of determining the next hop router through which the source communication router transmits data to the destination communication router through the wireless communication module comprises:
determining, by the source communication router according to the device configuration file, a wireless candidate router closest to the source communication router among the other communication routers with which the source communication router is capable of communicating through the wireless communication module;
testing whether the source communication router is capable of communicating with the destination communication router through the wireless communication module and the wireless candidate router;
when the source communication router is capable of communicating with the destination communication router through the wireless communication module and the wireless candidate router, setting the wireless candidate router to be the next hop router through which the source communication router transmits data to the destination communication router through the wireless communication module; and
when the source communication router is not capable of communicating with the destination communication router through the wireless communication module and the wireless candidate router, determining, by the source communication router according to the device configuration file, another wireless candidate router second closest to the source communication router among the other communication routers with which the source communication router is capable of communicating through the wireless communication module, and when the source communication router is capable of communicating with the destination communication router through the wireless communication module and the another wireless candidate router, setting the another wireless candidate router to be the next hop router through which the source communication router transmits data to the destination communication router through the wireless communication module.

8. The routing establishing method according to claim 1, wherein the device configuration file further comprises the quantity of single-chain networks in the router chain network, the quantity of leaf node devices in each single-chain network, the device number of the leaf node devices in each single-chain network, the device number of a root node, the node type, and the single-chain number of the single-chain network to which the leaf node belongs.

9. The routing establishing method according to claim 1, wherein the wired communication module is a power line communication module or an Ethernet communication module.

10. The routing establishing method according to claim 1, wherein the wireless communication module is a Wi-Fi communication module.

11. The routing establishing method according to claim 1, wherein an attribute of each communication router is a root node or a leaf node.

12. A communication router with automatic routing establishment, wherein the communication router is applied in a router chain network comprising a plurality of communication routers, each of the communication routers includes two routing table for the router chain network including a wired routing table for the router chain network and a wireless routing table for the router chain network, each of the routing tables for the router chain network records at least one destination communication router and a next hop router corresponding thereto, and one of the communication routers comprises:
a wired communication module;
a wireless communication module;
a storage unit, configured to store a device configuration file;
an environment exploration learning module, configured to perform a wired exploration procedure and a wireless exploration procedure, wherein the wired exploration procedure comprises performing exploration according to the device configuration file through the wired communication module to obtain a wired communication status between the communication router and the destination communication router among the other communication routers in the chain network, and the wireless exploration procedure comprises performing exploration according to the device configuration file through the wireless communication module to obtain a wireless communication status between the communication router and the destination communication router; and a routing optimization decision module, configured to perform a routing decision procedure comprising determining and setting, according to the wired communication status and the wireless communication status, a transmission routing from the communication router to the destination communication router is through the wired communication module or the wireless communication module and the next hop router of the communication router in the transmission routing, wherein the device configuration file comprises device numbers related to relative positions of the communication routers in the router chain network.

13. The communication router according to claim 12, wherein the wired exploration procedure performed by the environment exploration learning module comprises:

when the environment exploration learning module performs exploration according to the device configuration file through the wired communication module and determines that the communication router is capable of communicating with the destination communication router through the wired communication module, determining, by the environment exploration learning module, one of the other communication routers in the chain network as the next hop router through which the communication router transmits data to the destination communication router through the wired communication module;

wherein the wireless exploration procedure performed by the environment exploration learning module further comprises:

when the environment exploration learning module performs exploration according to the device configuration file through the wireless communication module and determines that the communication router is capable of communicating with the destination communication router through the wireless communication module, determining, by the environment exploration learning module, one of the other communication routers in the chain network as the next hop router through which the communication router transmits data to the destination communication router through the wireless communication module.

14. The communication router according to claim 13, wherein the storage unit further stores at least one explosion routing table, and the wired exploration procedure performed by the environment exploration learning module comprises recording a device number and a communication module type of the other communication router determined as the next hop router of the communication router in the at least one explosion routing table;

the wireless exploration procedure performed by the environment exploration learning module comprises recording a device number and a communication module type of the other communication router determined as the next hop router of the communication router in the at least one explosion routing table;

the routing decision procedure performed by the routing optimization decision module comprises according to the at least one explosion routing table and a routing optimization decision algorithm, setting the transmission routing of the communication router to be through the wired communication module and setting the next hop router of the communication router to be the other communication router determined as the next hop router in the wired exploration procedure, or setting the transmission routing of the communication router to be through the wireless communication module and setting the next hop router of the communication router to be the other communication router determined as the next hop router in the wireless exploration procedure.

15. The communication router according to claim 14, wherein the wired exploration procedure performed by the environment exploration learning module further comprises:

testing whether the communication router is capable of directly communicating with the destination communication router through the wired communication module;

when the communication router is capable of directly communicating with the destination communication router through the wired communication module, setting the destination communication router to be the next hop router through which the communication router transmits data to the destination communication router through the wired communication module; and when the communication router is not capable of directly communicating with the destination communication router through the wired communication module and is capable of communicating with the destination communication router through the wired communication module and at least one wired candidate router among the other communication routers, setting the wired candidate router closest to the destination communication router to be the next hop router through which the communication router transmits data to the destination communication router through the wired communication module.

16. The communication router according to claim 15, the wired exploration procedure performed by the environment exploration learning module further comprises:

when the communication router is not capable of directly communicating with the destination communication router through the wired communication module, determining, according to the device configuration file, the at least one wired candidate router among the other communication routers with which the communication router is capable of communicating through the wired communication module;

testing whether the communication router is capable of communicating with the destination communication router through the wired communication module and the at least one wired candidate router; and when the communication router is capable of communicating with the destination communication router through the wired communication module and the at least one wired candidate router, setting the wired candidate router closest to the destination communication router to be the next hop router through which the communication router transmits data to the destination communication router through the wired communication module.

17. The communication router according to claim 14, wherein the wireless exploration procedure performed by the environment exploration learning module further comprises:

determining, by the communication router, the other communication router, which is capable of communicating with the destination communication router and is closest to the communication router among the other communication routers with which the communication router is capable of communicating through the wireless communication module, as the next hop router through which the communication router transmits data to the destination communication router through the wireless communication module.

18. The communication router according to claim 17, wherein the wireless exploration procedure performed by the environment exploration learning module further comprises:
   determining, by the communication router according to the device configuration file, a wireless candidate router closest to the communication router among the other communication routers with which the communication router is capable of communicating through the wireless communication module;
   testing whether the communication router is capable of communicating with the destination communication router through the wireless communication module and the wireless candidate router;
   when the communication router is capable of communicating with the destination communication router through the wireless communication module and the wireless candidate router, setting the wireless candidate router to be the next hop router through which the communication router transmits data to the destination communication router through the wireless communication module; and
   when the communication router is not capable of communicating with the destination communication router through the wireless communication module and the wireless candidate router, determining, by the communication router according to the device configuration file, another wireless candidate router second closest to the communication router among the other communication routers with which the communication router is capable of communicating through the wireless communication module, and when the communication router is capable of communicating with the destination communication router through the wireless communication module and the another wireless candidate router, setting the another wireless candidate router to be the next hop router through which the communication router transmits data to the destination communication router through the wireless communication module.

19. The communication router according to claim 12, wherein the device configuration file further comprises the quantity of single-chain networks in the router chain network, the quantity of leaf node devices in each single-chain network, the device number of leaf node devices in each single-chain network, the device number of a root node, the node type, and the single-chain number of the single-chain network to which the leaf node belongs.

20. The communication router according to claim 12, wherein the wired communication module is a power line communication module or an Ethernet communication module.

21. The communication router according to claim 12, wherein the wireless communication module is a Wi-Fi communication module.

22. The communication router according to claim 12, wherein an attribute of each communication router is a root node or a leaf node.

* * * * *